United States Patent
El Dokor et al.

(10) Patent No.: US 10,721,448 B2
(45) Date of Patent: Jul. 21, 2020

(54) METHOD AND APPARATUS FOR ADAPTIVE EXPOSURE BRACKETING, SEGMENTATION AND SCENE ORGANIZATION

(71) Applicant: Edge 3 Technologies, Inc., Phoenix, AZ (US)

(72) Inventors: Tarek El Dokor, Phoenix, AZ (US); Jordan Cluster, Tempe, AZ (US); Joshua King, Mesa, AZ (US)

(73) Assignee: Edge 3 Technologies, Inc., Phoenix, AZ (US)

( * ) Notice: Subject to any disclaimer, the term of this patent is extended or adjusted under 35 U.S.C. 154(b) by 359 days.

(21) Appl. No.: 13/831,638

(22) Filed: Mar. 15, 2013

(65) Prior Publication Data

US 2014/0267612 A1 Sep. 18, 2014

(51) Int. Cl.
  *H04N 9/73* (2006.01)
  *H04N 5/235* (2006.01)
  *G06K 9/46* (2006.01)

(52) U.S. Cl.
  CPC .......... *H04N 9/735* (2013.01); *G06K 9/4661* (2013.01); *H04N 5/2356* (2013.01)

(58) Field of Classification Search
  CPC ......... G03C 7/3022; G01N 2021/6421; H04N 1/486; H04N 9/735
  See application file for complete search history.

(56) References Cited

U.S. PATENT DOCUMENTS

| | | | |
|---|---|---|---|
| 5,454,043 A | | 9/1995 | Freeman |
| 5,504,524 A | * | 4/1996 | Lu et al. ............ 348/223.1 |
| 5,544,050 A | | 8/1996 | Abe et al. |
| 5,581,276 A | | 12/1996 | Cipolla et al. |
| 5,594,469 A | | 1/1997 | Freeman et al. |
| 5,699,441 A | | 12/1997 | Sagawa et al. |
| 5,767,842 A | | 6/1998 | Korth |
| 5,887,069 A | | 3/1999 | Sakou et al. |
| 5,990,865 A | | 11/1999 | Gard |
| 6,002,808 A | | 12/1999 | Freeman |
| 6,072,494 A | | 6/2000 | Nguyen |

(Continued)

OTHER PUBLICATIONS

Freeman, W. T. et al., "The Design and Use of Steerable Filters", *IEEE Transactions of Pattern Analysis and Machine Intelligence* V. 13, (Sep. 1991),891-906.

(Continued)

*Primary Examiner* — Zhubing Ren
(74) *Attorney, Agent, or Firm* — Gordon Kessler

(57) ABSTRACT

A method, system and computer program are provided that present a real-time approach to Chromaticity maximization to be used in image segmentation. The ambient illuminant in a scene may be first approximated. The input image may then be preprocessed to remove the impact of the illuminant, and approximate an ambient white light source instead. The resultant image is then choma-maximized. The result is an adaptive Chromaticity maximization algorithm capable of adapting to a wide dynamic range of illuminations. A segmentation algorithm is put in place as well that takes advantage of such an approach. This approach also has applications in HDR photography and real-time HDR video.

14 Claims, 25 Drawing Sheets
(19 of 25 Drawing Sheet(s) Filed in Color)

(56) References Cited

U.S. PATENT DOCUMENTS

| | | | |
|---|---|---|---|
| 6,075,895 A | 6/2000 | Qiao et al. |
| 6,115,482 A | 9/2000 | Sears et al. |
| 6,128,003 A | 10/2000 | Smith et al. |
| 6,141,434 A | 10/2000 | Christian et al. |
| 6,147,678 A | 11/2000 | Kumar et al. |
| 6,181,343 B1 | 1/2001 | Lyons |
| 6,195,104 B1 | 2/2001 | Lyons |
| 6,204,852 B1 | 3/2001 | Kumar et al. |
| 6,215,890 B1 | 4/2001 | Matsuo et al. |
| 6,222,465 B1 | 4/2001 | Kumar et al. |
| 6,240,197 B1 | 5/2001 | Christian et al. |
| 6,240,198 B1 | 5/2001 | Rehg et al. |
| 6,252,598 B1 | 6/2001 | Segen |
| 6,256,033 B1 | 7/2001 | Nguyen |
| 6,256,400 B1 | 7/2001 | Takata et al. |
| 6,269,172 B1 | 7/2001 | Rehg et al. |
| 6,323,942 B1 | 11/2001 | Bamji |
| 6,324,453 B1 | 11/2001 | Breed et al. |
| 6,360,003 B1 | 3/2002 | Doi et al. |
| 6,363,160 B1 | 3/2002 | Bradski et al. |
| 6,377,238 B1 | 4/2002 | McPheters |
| 6,389,182 B1 | 5/2002 | Ihara et al. |
| 6,394,557 B2 | 5/2002 | Bradski |
| 6,400,830 B1 | 6/2002 | Christian et al. |
| 6,434,255 B1 | 8/2002 | Harakawa |
| 6,442,465 B2 | 8/2002 | Breed et al. |
| 6,456,728 B1 | 9/2002 | Doi et al. |
| 6,478,432 B1 | 11/2002 | Dyner |
| 6,509,707 B2 | 1/2003 | Yamashita et al. |
| 6,512,838 B1 | 1/2003 | Rafii et al. |
| 6,526,156 B1 | 2/2003 | Black et al. |
| 6,553,296 B2 | 4/2003 | Breed et al. |
| 6,556,708 B1 | 4/2003 | Christian et al. |
| 6,571,193 B1 | 5/2003 | Unuma et al. |
| 6,590,605 B1 | 7/2003 | Eichenlaub |
| 6,600,475 B2 | 7/2003 | Gutta et al. |
| 6,608,910 B1 | 8/2003 | Srinivasa et al. |
| 6,614,422 B1 | 9/2003 | Rafii et al. |
| 6,624,833 B1 | 9/2003 | Kumar et al. |
| 6,674,877 B1 | 1/2004 | Jojic et al. |
| 6,674,895 B2 | 1/2004 | Rafii et al. |
| 6,678,425 B1 | 1/2004 | Flores et al. |
| 6,681,031 B2 | 1/2004 | Cohen et al. |
| 6,683,968 B1 | 1/2004 | Pavlovic et al. |
| 6,757,571 B1 | 6/2004 | Toyama |
| 6,766,036 B1 | 7/2004 | Pryor |
| 6,768,486 B1 | 7/2004 | Szabo et al. |
| 6,788,809 B1 | 9/2004 | Grzeszczuk et al. |
| 6,795,567 B1 | 9/2004 | Cham et al. |
| 6,801,637 B2 | 10/2004 | Voronka et al. |
| 6,804,396 B2 | 10/2004 | Higaki et al. |
| 6,829,730 B2 | 12/2004 | Nadeau-Dostie et al. |
| 6,857,746 B2 | 2/2005 | Dyner |
| 6,901,561 B1 | 5/2005 | Kirkpatrick et al. |
| 6,937,742 B2 | 8/2005 | Roberts et al. |
| 6,940,646 B2 | 9/2005 | Taniguchi et al. |
| 6,944,315 B1 | 9/2005 | Zipperer et al. |
| 6,950,534 B2 | 9/2005 | Cohen et al. |
| 6,993,462 B1 | 1/2006 | Pavlovic et al. |
| 7,039,676 B1 | 5/2006 | Day et al. |
| 7,046,232 B2 | 5/2006 | Inagaki et al. |
| 7,050,606 B2 | 5/2006 | Paul et al. |
| 7,050,624 B2 | 5/2006 | Dialameh et al. |
| 7,058,204 B2 | 6/2006 | Hildreth et al. |
| 7,065,230 B2 | 6/2006 | Yuasa et al. |
| 7,068,842 B2 | 6/2006 | Liang et al. |
| 7,095,401 B2 | 8/2006 | Liu et al. |
| 7,102,615 B2 | 9/2006 | Marks |
| 7,129,927 B2 | 10/2006 | Mattson |
| 7,170,492 B2 | 1/2007 | Bell |
| 7,190,811 B2 | 3/2007 | Ivanov |
| 7,203,340 B2 | 4/2007 | Gorodnichy |
| 7,212,663 B2 | 5/2007 | Tomasi |
| 7,221,779 B2 | 5/2007 | Kawakami et al. |
| 7,224,830 B2 | 5/2007 | Nefian et al. |
| 7,224,851 B2 | 5/2007 | Kinjo |
| 7,233,320 B1 | 6/2007 | Lapstun et al. |
| 7,236,611 B2 | 6/2007 | Roberts et al. |
| 7,239,718 B2 | 7/2007 | Park et al. |
| 7,257,237 B1 | 8/2007 | Luck et al. |
| 7,274,800 B2 | 9/2007 | Nefian et al. |
| 7,274,803 B1 | 9/2007 | Sharma et al. |
| 7,289,645 B2 | 10/2007 | Yamamoto et al. |
| 7,295,709 B2 | 11/2007 | Cootes et al. |
| 7,296,007 B1 | 11/2007 | Funge et al. |
| 7,308,112 B2 | 11/2007 | Fujimura et al. |
| 7,340,077 B2 | 3/2008 | Gokturk et al. |
| 7,340,078 B2 | 3/2008 | Shikano et al. |
| 7,342,485 B2 | 3/2008 | Joehl et al. |
| 7,346,192 B2 | 3/2008 | Yuasa et al. |
| 7,348,963 B2 | 3/2008 | Bell |
| 7,359,529 B2 | 4/2008 | Lee |
| 7,372,977 B2 | 5/2008 | Fujimura et al. |
| 7,379,563 B2 | 5/2008 | Shamaie |
| 7,391,409 B2 | 6/2008 | Zalewski et al. |
| 7,394,346 B2 | 7/2008 | Bodin |
| 7,412,077 B2 | 8/2008 | Li et al. |
| 7,415,126 B2 | 8/2008 | Breed et al. |
| 7,415,212 B2 | 8/2008 | Matsushita et al. |
| 7,421,093 B2 | 9/2008 | Hildreth et al. |
| 7,423,540 B2 | 9/2008 | Kisacanin |
| 7,444,001 B2 | 10/2008 | Roberts et al. |
| 7,450,736 B2 | 11/2008 | Yang et al. |
| 7,460,690 B2 | 12/2008 | Cohen et al. |
| 7,477,758 B2 | 1/2009 | Piirainen et al. |
| 7,489,308 B2 | 2/2009 | Blake et al. |
| 7,489,806 B2 | 2/2009 | Mohri et al. |
| 7,499,569 B2 | 3/2009 | Sato et al. |
| 7,512,262 B2 | 3/2009 | Criminisi et al. |
| 7,519,223 B2 | 4/2009 | Dehlin et al. |
| 7,519,537 B2 | 4/2009 | Rosenberg |
| 7,574,020 B2 | 8/2009 | Shamaie |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,599,547 B2 | 10/2009 | Sun et al. |
| 7,606,411 B2 | 10/2009 | Venetsky et al. |
| 7,612,813 B2 * | 11/2009 | Hunter ............... H04N 5/2351 348/221.1 |
| 7,614,019 B2 | 11/2009 | Rimas Ribikauskas et al. |
| 7,620,316 B2 | 11/2009 | Boillot |
| 7,646,372 B2 | 1/2010 | Marks et al. |
| 7,660,437 B2 | 2/2010 | Breed |
| 7,665,041 B2 | 2/2010 | Wilson et al. |
| 7,676,062 B2 | 3/2010 | Breed et al. |
| 7,720,282 B2 | 5/2010 | Blake et al. |
| 7,721,207 B2 | 5/2010 | Nilsson |
| 7,804,998 B2 | 9/2010 | Mundermann Lars et al. |
| 2001/0001182 A1 | 5/2001 | Ito et al. |
| 2001/0030642 A1 | 10/2001 | Sullivan et al. |
| 2002/0041327 A1 | 4/2002 | Hildreth et al. |
| 2002/0064382 A1 | 5/2002 | Hildreth et al. |
| 2002/0090133 A1 | 7/2002 | Kim et al. |
| 2002/0140633 A1 | 10/2002 | Rafii et al. |
| 2002/0176010 A1 * | 11/2002 | Wallach et al. ............ 348/229.1 |
| 2004/0183775 A1 | 9/2004 | Bell |
| 2005/0002074 A1 | 1/2005 | McPheters et al. |
| 2005/0083314 A1 | 4/2005 | Shalit et al. |
| 2005/0105775 A1 | 5/2005 | Luo et al. |
| 2005/0190443 A1 | 9/2005 | Nam et al. |
| 2005/0286756 A1 | 12/2005 | Hong et al. |
| 2006/0093186 A1 | 5/2006 | Ivanov |
| 2006/0101354 A1 | 5/2006 | Hashimoto et al. |
| 2006/0136846 A1 | 6/2006 | Im et al. |
| 2006/0139314 A1 | 6/2006 | Bell |
| 2006/0221072 A1 | 10/2006 | Se et al. |
| 2007/0055427 A1 | 3/2007 | Sun et al. |
| 2007/0113207 A1 | 5/2007 | Gritton |
| 2007/0132721 A1 | 6/2007 | Glomski et al. |
| 2007/0195997 A1 | 8/2007 | Paul et al. |
| 2007/0211165 A1 * | 9/2007 | Yaguchi ............... H04N 5/238 348/362 |
| 2007/0263932 A1 | 11/2007 | Bernardin et al. |
| 2007/0280505 A1 | 12/2007 | Breed |

(56) References Cited

U.S. PATENT DOCUMENTS

| | | |
|---|---|---|
| 2008/0002878 A1 | 1/2008 | Meiyappan et al. |
| 2008/0005703 A1 | 1/2008 | Radivojevic et al. |
| 2008/0013793 A1 | 1/2008 | Hillis et al. |
| 2008/0037875 A1 | 2/2008 | Kim et al. |
| 2008/0052643 A1 | 2/2008 | Ike et al. |
| 2008/0059578 A1 | 3/2008 | Albertson et al. |
| 2008/0065291 A1 | 3/2008 | Breed |
| 2008/0069415 A1 | 3/2008 | Schildkraut et al. |
| 2008/0069437 A1 | 3/2008 | Baker |
| 2008/0104547 A1 | 5/2008 | Morita et al. |
| 2008/0107303 A1 | 5/2008 | Kim et al. |
| 2008/0120577 A1 | 5/2008 | Ma et al. |
| 2008/0178126 A1 | 7/2008 | Beeck et al. |
| 2008/0181459 A1 | 7/2008 | Martin et al. |
| 2008/0219501 A1 | 9/2008 | Matsumoto |
| 2008/0219502 A1 | 9/2008 | Shamaie |
| 2008/0225041 A1 | 9/2008 | El Dokor et al. |
| 2008/0229255 A1 | 9/2008 | Linjama et al. |
| 2008/0240502 A1 | 10/2008 | Freedman et al. |
| 2008/0244465 A1 | 10/2008 | Kongqiao et al. |
| 2008/0244468 A1 | 10/2008 | Nishihara et al. |
| 2008/0267449 A1 | 10/2008 | Dumas et al. |
| 2008/0282202 A1 | 11/2008 | Sunday |
| 2009/0006292 A1 | 1/2009 | Block |
| 2009/0027337 A1 | 1/2009 | Hildreth |
| 2009/0037849 A1 | 2/2009 | Immonen et al. |
| 2009/0040215 A1 | 2/2009 | Afzulpurkar et al. |
| 2009/0060268 A1 | 3/2009 | Roberts et al. |
| 2009/0074248 A1 | 3/2009 | Cohen et al. |
| 2009/0077504 A1 | 3/2009 | Bell et al. |
| 2009/0079813 A1 | 3/2009 | Hildreth |
| 2009/0080526 A1 | 3/2009 | Vasireddy et al. |
| 2009/0085864 A1 | 4/2009 | Kutliroff et al. |
| 2009/0102788 A1 | 4/2009 | Nishida et al. |
| 2009/0102800 A1 | 4/2009 | Keenan |
| 2009/0103780 A1 | 4/2009 | Nishihara et al. |
| 2009/0108649 A1 | 4/2009 | Kneller et al. |
| 2009/0109036 A1 | 4/2009 | Schalla et al. |
| 2009/0110292 A1 | 4/2009 | Fujimura et al. |
| 2009/0115721 A1 | 5/2009 | Aull et al. |
| 2009/0116742 A1 | 5/2009 | Nishihara |
| 2009/0116749 A1 | 5/2009 | Cristinacce et al. |
| 2009/0150160 A1 | 6/2009 | Mozer |
| 2009/0153366 A1 | 6/2009 | Im et al. |
| 2009/0153655 A1 | 6/2009 | Ike et al. |
| 2009/0180668 A1 | 7/2009 | Jones et al. |
| 2009/0183125 A1 | 7/2009 | Magal et al. |
| 2009/0183193 A1 | 7/2009 | Miller, IV |
| 2009/0189858 A1 | 7/2009 | Lev et al. |
| 2009/0208057 A1 | 8/2009 | Wilson et al. |
| 2009/0222149 A1 | 9/2009 | Murray et al. |
| 2009/0228841 A1 | 9/2009 | Hildreth |
| 2009/0231278 A1 | 9/2009 | St Hilaire et al. |
| 2009/0244309 A1 | 10/2009 | Maison et al. |
| 2009/0249258 A1 | 10/2009 | Tang |
| 2009/0262986 A1 | 10/2009 | Cartey et al. |
| 2009/0268945 A1 | 10/2009 | Wilson et al. |
| 2009/0273563 A1 | 11/2009 | Pryor |
| 2009/0273574 A1 | 11/2009 | Pryor |
| 2009/0273575 A1 | 11/2009 | Pryor |
| 2009/0278915 A1 | 11/2009 | Kramer et al. |
| 2009/0295738 A1 | 12/2009 | Chiang |
| 2009/0296991 A1 | 12/2009 | Anzola |
| 2009/0315740 A1 | 12/2009 | Hildreth et al. |
| 2009/0316952 A1 | 12/2009 | Ferren et al. |

OTHER PUBLICATIONS

Simoncelli, E.P. et al., "Shiftable Multi-scale Transforms", *IEEE Transactions on Information Theory* V. 38, (Mar. 1992),587-607.

Simoncelli, E.P. et al., "The Steerable Pyramid: A Flexible Architecture for Multi-Scale Derivative Computation", *Proceedings of ICIP-95* V. 3, (Oct. 1995),444-447.

Chen, J et al., "Adaptive Perceptual Color-Texture Image Segmentation", *IEEE Transactions on Image Processing*, v. 14, No. 10, (Oct. 2005),1524-1536 (2004 revised draft).

Halfhill, Tom R., "Parallel Processing with CUDA", *Microprocessor Report*, Available at http://www.nvidia.com/docs/IO/55972/220401_Reprint.pdf,(Jan. 28, 2008).

Farber, Rob "CUDA, Supercomputing for the Masses: Part 4, The CUDA Memory Model", Under the High Performance Computing section of the Dr. Dobbs website, p. 3 available at http://www.ddj.com/hpc-high-performance-computing/208401741, 3.

Rajko, S et al., "HMM Parameter Reduction for Practice Gesture Recognition", *Proceedings of the International Conference on Automatic Gesture Recognition*, (Sep. 2008).

Hinton, Geoffrey et al., "A Fast Learning Algorithm for Deep Belief Nets", *Neural Computation*, V. 18, 1527-1554.

Susskind, Joshua M., et al., "Generating Facial Expressions with Deep Belief Nets", Department of Psychology, Univ. of Toronto I-Tech Education and Publishing, (2008),421-440.

Bleyer, Michael et al., "Surface Stereo with Soft Segmentation.", *Computer Vision and Pattern Recognition*. IEEE, 2010, (2010).

Chen, Junqing et al., "Adaptive perceptual color-texture image segmentation.",*The International Society for Optical Engineering*, SPIE Newsroom, (2006),1-2.

Forsyth, David A., et al., "Stereopsis", *In Computer Vision a Modern Approach* Prentice Hall, 2003, (2003).

Harris, Mark et al., "Parallel Prefix Sum (Scan) with CUDA", vol. 39 in *GPU Gems 3*, edited by Hubert Nguyen, (2007).

Hirschmuller, Heiko "Stereo Vision in Structured Environments by Consistent Semi-Global Matching", *Computer Vision and Pattern Recognition*, CVPR 06, (2006),2386-2393.

Ivekovic, Spela et al., "Dense Wide-baseline Disparities from Conventional Stereo for Immersive Videoconferencing", *ICPR*. 2004, (2004),921-924.

Kaldewey, Tim et al., "Parallel Search on Video Cards.", *First USENIX Workshop on Hot Topics in Parallelism*(HotPar '09), (2009).

Kirk, David et al., "Programming Massively Parallel Processors a Hands-on Approach", *Elsevier*, 2010, (2010).

Klaus, Andreas et al., "Segment-Based Stereo Matching Using Belief Propagation and a Self-Adapting Dissimilarity Measure", *Proceedings of ICPR 2006*. IEEE, 2006, (2006),15-18.

Kolmogorov, Vladimir et al., "Computing Visual Correspondence with Occlusions via Graph Cuts", *International Conference on Computer Vision*. 2001., (2001).

Kolmogorov, Vladimir et al., "Generalized Multi-camera Scene Reconstruction Using Graph Cuts.", *Proceedings for the International Workshop on Energy Minimization Methods in Computer Vision and Pattern Recognition*. 2003., (2003).

Kuhn, Michael et al., "Efficient ASIC Implementation of a Real-Time Depth Mapping Stereo Vision System", *Proceedings of 2009 IEEE International Conference on Acoustics, Speech and Signal Processing*. Taipei, Taiwan: IEEE, 2009., (2009).

Li, Shigang "Binocular Spherical Stereo", *IEEE Transactions on Intelligent Transportation Systems*(IEEE) 9, No. 4 (Dec. 2008), (Dec. 2008),589-600.

Marsalek, M et al., "Semantic hierarchies for visual object recognition", *Proceedings of IEEE Conference on Computer Vision and Pattern Recognition*, 2007. CVPR '07. MN: IEEE, 2007, (2007),1-7.

Metzger, Wolfgang "Laws of Seeing", *MIT Press*, 2006, (2006).

Min, Dongbo et al., "Cost Aggregation and Occlusion Handling With WLS in Stereo Matching", Edited by IEEE. *IEEE Transactions on Image Processing 17*(2008), (2008),1431-1442.

"NVIDIA: CUDA compute unified device architecture, prog. guide, version 1.1", *NVIDIA*, (2007).

Remondino, Fabio et al., "Turning Images into 3-D Models", *IEEE Signal Processing Magazine*, (2008).

Richardson, Ian E., "H.264/MPEG-4 Part 10 White Paper", *White Paper*/www.vcodex.com, (2003).

Sengupta, Shubhabrata "Scan Primitives for GPU Computing", *Proceedings of the 2007 Graphics Hardware Conference*. San Diego, CA, 2007, (2007),97-106.

(56) References Cited

OTHER PUBLICATIONS

Sintron, Eric et al., "Fast Parallel GPU-Sorting Using a Hybrid Algorithm", *Journal of Parallel and Distributed Computing* (Elsevier) 68, No. 10, (Oct. 2008), 1381-1388.
Wang, Zeng-Fu et al., "A Region Based Stereo Matching Algorithm Using Cooperative Optimization", *CVPR* (2008).
Wei, Zheng et al., "Optimization of Linked List Prefix Computations on Multithreaded GPUs Using CUDA", *2010 IEEE International Symposium on Parallel & Distributed Processing* (IPDPS). Atlanta, (2010).
Wiegand, Thomas et al., "Overview of the H.264/AVC Video Coding Standard", *IEEE Transactions on Circuits and Systems for Video Technology 13*, No. 7 (Jul. 2003), 560-576.
Woodford, O.J. et al., "Global Stereo Reconstruction under Second Order Smoothness Priors", *IEEE Transactions on Pattern Analysis and Machine Intelligence* (IEEE) 31, No. 12, (2009), 2115-2128.
Yang, Qingxiong et al., "Stereo Matching with Color-Weighted Correlation, Hierarchical Belief Propagation, and Occlusion Handling", *IEEE Transactions on Pattern Analysis and Machine Intelligence* (IEEE) 31, No. 3, (Mar. 2009), 492-504.
Zinner, Christian et al., "An Optimized Software-Based Implementation of a Census-Based Stereo Matching Algorithm", *Lecture Notes in Computer Science* (SpringerLink) 5358, (2008), 216-227.
"PCT Search report", PCT/US2010/035717, (dated Sep. 1, 2010), 1-29.
"PCT Written opinion", PCT/US2010/035717, (dated Dec. 1, 2011), 1-9.
"PCT Search report", PCT/US2011/49043, (dated Mar. 21, 2012), 1-4.
"PCT Written opinion", PCT/US2011/49043, (dated Mar. 21, 2012), 1-4.
"PCT Search report", PCT/US2011/049808, (dated Jan. 12, 2012), 1-2.
"PCT Written opinion", PCT/US2011/049808, (dated Jan. 12, 2012), 1-5.
"Non-Final Office Action", U.S. Appl. No. 12/784,123, (dated Oct. 2, 2012), 1-20.
"Non-Final Office Action", U.S. Appl. No. 12/784,022, (dated Jul. 16, 2012), 1-14.
Tieleman, T et al., "Using Fast weights to improve persistent contrastive divergence", *26th International Conference on Machine Learning New York*, NY ACM, (2009), 1033-1040.
Sutskever, I et al., "The recurrent temporal restricted boltzmann machine", *NIPS*, MIT Press, (2008), 1601-1608.
Parzen, E "On the estimation of a probability density function and the mode", *Annals of Math. Stats.*, 33, (1962), 1065-1076.
Hopfield, J.J. "Neural networks and physical systems with emergent collective computational abilities", *National Academy of Sciences*, 79, (1982), 2554-2558.
Culibrk, D et al., "Neural network approach to background modeling for video object segmentation", *IEEE Transactions on Neural Networks*, 18, (2007), 1614-1627.
Benggio, Y et al., "Curriculum learning", *ICML 09 Proceedings of the 26th Annual International Conference on Machine Learning*, New York, NY: ACM, (2009).
Benggio, Y et al., "Scaling learning algorithms towards AI. In L. a Bottou", *Large Scale Kernel Machines*, MIT Press, (2007).
Battiato, S et al., "Exposure correction for imaging devices: An overview", In R. Lukac (Ed.), *Single Sensor Imaging Methods and Applications for Digital Cameras*, CRC Press, (2009), 323-350.
U.S. Appl. No. 12/028,704, filed Feb. 2, 2008, Method and System for Vision-Based Interaction in a Virtual Environment.
U.S. Appl. No. 13/405,319, filed Feb. 26, 2012, Method and System for Vision-Based Interaction in a Virtual Environment.
U.S. Appl. No. 13/411,657, filed Mar. 5, 2012, Method and System for Vision-Based Interaction in a Virtual Environment.
U.S. Appl. No. 13/429,437, filed Mar. 25, 2012, Method and System for Vision-Based Interaction in a Virtual Environment.
U.S. Appl. No. 13/562,351, filed Jul. 31, 2012, Method and System for Tracking of a Subject.
U.S. Appl. No. 13/596,093, filed Aug. 28, 2012 Method and Apparatus for Three Dimensional Interaction of a Subject.
U.S. Appl. No. 11/567,888, filed Dec. 7, 2006, Three-Dimensional Virtual-Touch Human-Machine Interface System and Method Therefor.
U.S. Appl. No. 13/572,721, filed Aug. 13, 2012, Method and System for Three-Dimensional Virtual-Touch Interface.
U.S. Appl. No. 12/784,123, filed Mar. 20, 2010, Gesture Recognition Systems and Related Methods.
U.S. Appl. No. 12/784,022, filed May 20, 2010, Systems and Related Methods for Three Dimensional Gesture Recognition in Vehicles.
U.S. Appl. No. 13/025,038, filed Feb. 10, 2011, Method and Apparatus for Performing Segmentation of an Image.
U.S. Appl. No. 13/025,055, filed Feb. 10, 2011, Method and Apparatus for Disparity Computation in Stereo Images.
U.S. Appl. No. 13/025,070, filed Feb. 10, 2011, Method and Apparatus for Determining Disparity of Texture.
U.S. Appl. No. 13/221,903, filed Aug. 31, 2011, Method and Apparatus for Confusion Learning.
U.S. Appl. No. 13/189,517, filed Jul. 24, 2011, Near-Touch Interaction with a Stereo Camera Grid and Structured.
U.S. Appl. No. 13/297,029, filed Nov. 15, 2011, Method and Apparatus for Fast Computational Stereo.
U.S. Appl. No. 13/297,144, filed Nov. 15, 2011, Method and Apparatus for Fast Computational Stereo.
U.S. Appl. No. 13/294,481, filed Nov. 11, 2011, Method and Apparatus for Enhanced Stereo Vision.
U.S. Appl. No. 13/316,606, filed Dec. 12, 2011, Method and Apparatus for Enhanced Stereo Vision.

\* cited by examiner

METHOD AND APPARATUS FOR ADAPTIVE EXPOSURE BRACKETING, SEGMENTATION AND SCENE ORGANIZATION

BACKGROUND

Many approaches exist that enable high-quality imaging systems with good image capture quality. These systems, however, fail to provide a complete solution imaging system that includes a given capture system and an associated quality rendering system that can extract the best color settings associated with a given scene.

SUMMARY

Color Constancy in the Human Visual System (HVS) and Illuminant Approximation

Color constancy has been described in Chakrabarti, A., Hirakawa, K., & Zickler, T. (2011), Color Constancy with Spatio-Spectral Statistics. IEEE Transactions on Pattern Analysis and Machine Intelligence, and refers to a property of color descriptors allowing for inference of appropriate colors in spite of changes in lighting. This is therefore a perceptual notion that colors and their perception fundamentally don't change as images change in a scene during subjective testing. As such, colors of various objects are usually perceived uniformly by the Human Visual System in spite of the fact that such objects may change colors as they are being observed, or as they undergo different ambient lighting conditions from different illuminants. Stockman, A., & Brainard, D. (2010). Color vision mechanisms. OSA Handbook of Optics (3rd edition, M. Bass, ed), 11.1-11.104. hence, a very powerful quality of biological vision involves maintaining a robust estimate of the color of objects even as such objects change their perceived color values. This perceptual quality is very powerful and has been the focus of much research on how to emulate color constancy.

Described aptly in (Stockman & Brainard, 2010), "When presented in the same context under photopic conditions, pairs of lights that produce the same excitations in the long-, middle-, and short-wavelength-sensitive (L-, M-, and S-) cones match each other exactly in appearance. Moreover, this match survives changes in context and changes in adaptation, provided that the changes are applied equally to both lights." Biological color constancy, however, has its limits and typically falls short under various conditions. As a fun example, optical illusions are presented in (Lotto's Illusion), where perceptions of different illumination levels, colors, and light sources are presented as examples. As illuminant changes happen drastically in the field-of-view, humans are more likely to confuse color quality. Estimating an illuminant is a good starting point, but compensating for the illuminant is a problem in itself, and has been the subject of much research, see Barnard, K., Cardei, V., & Funt, B. (2002). A comparison of computational color constancy algorithms—Part I: Methodology and experiments with synthesized data. IEEE Trans. Image Processing, 11 (9), 972-984, and Gijsenij, A., Gevers, T., & Weijer, J. (2011). Computational Color Constancy: Survey and Experiments. IEEE Trans. Image Processing, 20 (9), 2475-2489.as example approaches to computing illuminant estimators. Biological vision, while powerful, isn't perfect and can be fooled and confused by a variety of circumstances: it is relatively easy to fool people's visual capacities as well as other animals' by camouflaging colors, and by changing the first and second-order statistics of different objects.

Additionally, estimating the illuminant is an inherently underdetermined problem, i.e., with significantly more scene parameters than there are degrees of freedom in the data. Estimating the illuminant is, hence, an inherently nonlinear problem, with many degrees of freedom. It is therefore important to make some simplifying assumptions before proceeding:

1) The notion of color constancy in the HVS has its limitations and may not be very appropriate to applications where changes in lighting occur rapidly and frequently, such circumstances being very different than what the HVS or even biological vision may be used to.

2) Maintaining a notion of color constancy is less important than maintaining a sense of color consistency. At very high frame rates, with lighting changes occurring suddenly and abruptly, it becomes essential to maintain a notion of color consistency across frames, while not necessarily maintaining color constancy across the entire dataset, potentially comprised of millions of frames.

3) Cameras are not analogous to biological eyes. Cameras may over-expose, under-expose, or use a series of rolling exposures in ways that biological vision is not capable of. Moreover, cameras may be underexposed completely, such that only very little light is incident onto the sensors, and then having depth perception accomplished for whatever little information is present, or having the cameras significantly overexposed, such that significantly darker regions are adequately exposed. While the HVS may use autofocus, vary the aperture, and adapt to changing lighting, the speed with which it does so may hinder high-end machine vision applications. It is important in accordance with one or more embodiments of the invention to be able to preferably vary camera settings at speeds that are significantly greater than possible by the HVS.

4) There is a need to synthetically predict/compute images at different exposures in real-time and at a very high frame rates, given a set of observations. In accordance with this approach presented in accordance with one or more embodiments of the present invention, the entire relevance of the HVS becomes marginalized, relatively to computational models of scene analysis that can extra critical information about the response of the cameras to different illuminants. Again, this is a departure from the usual HVS-inspired approaches.

Therefore, in accordance with one or more embodiments of the present invention, an overview of illuminant estimation, and how such illuminant estimation is applicable to modifying a scene's trichromatic feature set, adapting and compensating for such illuminants will be provided. Various embodiments of the present invention are provided, based on the notion of chromaticity maximization and hue value consistency, including the concepts of false colors, as well as identifying metallic data profiles as well as various other specularities that may produce such false colors. Comparisons between true color-based profiles and their gray-ish counterparts may then be made. Irradiance histograms and their relationship to auto-exposure bracketing are presented. Algorithms for applying an inventive synthetic image formation approach to auto-exposure bracketing (AEB) are also presented. A control algorithm that enables such an AEB approach is provided in accordance with one or more embodiments of the invention. This AEB approach may be applied to segmentation itself, and thus such segmentation can be improved by integrating synthetic exposure estimates associated with chromaticity maximization/hue consistency computation. Therefore, it is suggested in accordance with the various embodiments of the invention, that by maximizing chromaticity, one can ensure that the true hue that is associated with a given pixel or object is accurately estimated. In doing so, Chromaticity maximization is one way of maintaining hue and color consistency.

Still other objects and advantages of the invention will in part be obvious and will in part be apparent from the specification and drawings.

The invention accordingly comprises the several steps and the relation of one or more of such steps with respect to each of the other steps, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

For a more complete understanding of the invention, reference is made to the following description and accompanying drawings, in which.

DETAILED DESCRIPTION

Figure 1:
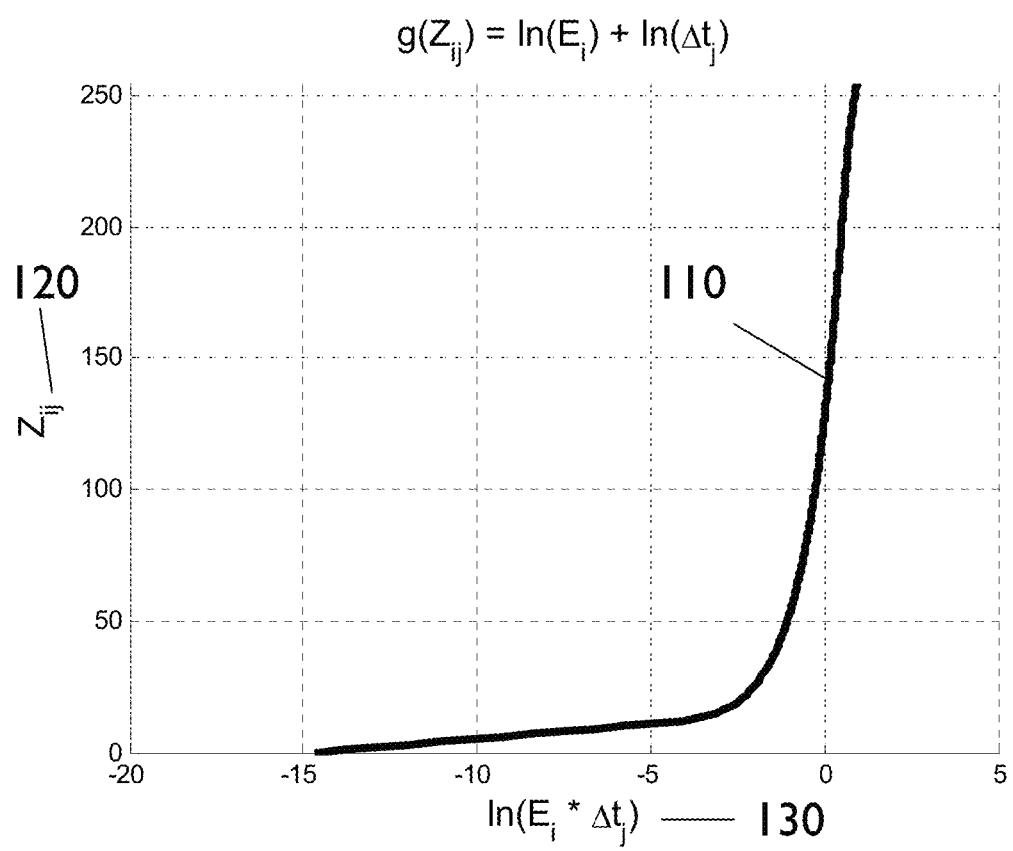
FIG. 1 is an example of a recovered camera response function.

One or more embodiments of the invention will now be described, making reference to the following drawings in which like reference numbers indicate like structure between the drawings.

Illuminant Estimation

Image colors may vary significantly as a function of an illuminant incident on one or more given surfaces that may be under observation. As has been recognized by the inventors of the present invention, successfully estimating this illuminant color is essential in the analysis of a given object's true color value. In accordance with one or more embodiments of the invention, it has been determined that color is inherently perceived as a function of incident illuminant light (or an ensemble of illuminant light sources) as well as the surface's relationship to that ensemble.

Chromaticity Maximization with the Camera Response Function

As noted above, the overall goal of Chromaticity maximization is to devise a means for maintaining color consistency across scenes with different lighting conditions and under different illuminants. To accomplish this goal, in accordance with one or more embodiments of the present invention, a camera response function is first computed and then used to synthetically create profiles of various pixels at different exposures. Then, the exposure that maximizes chromaticity is determined and is therefore employed in accordance with one or more embodiments of the invention.

Overview of the Camera Response Function

A camera response function relates scene radiance to image brightness. For a given camera response function the measured intensity, Z, is given by Debevec, P. E., & Malik, J. (1997). Recovering High Dynamic Range Radiance Maps from Photographs. SIGGRAPH 97:

$$Z_{ij}=f(E_i t_j) \qquad \text{Equation 1}$$

where f encapsulates the nonlinear relationship between sensor irradiance, E, and the measured intensity of a photosensitive element (pixel) over an exposure time, t (Debevec & Malik, 1997) is given by Z.

The camera response function can be used to convert intensity to irradiance by recovering the inverse of the response, denoted as $f^{-1}$:

$$f^{-1}(Z_{ij})=E_i t_j \qquad \text{Equation 2}$$

Taking the natural logarithm of both sides, g represents the inverse log function defined by:

$$g(Z_{ij})=\ln(f^{-1}(Z_{ij}))=\ln(E_i)+\ln(t_j) \qquad \text{Equation 3}$$

Letting $Z_{min}$ and $Z_{max}$ define the minimum and maximum pixel intensities of N pixels and P images, g can be solved by minimizing the following quadratic objective function:

$$O = \sum_{i=1}^{N} \sum_{j=1}^{P} \{w(Z_{ij})[g(Z_{ij}) - \ln(E_i) - \ln(t_j)]\}^2 + \lambda \sum_{z=Z_{min}+1}^{Z_{max}-1} (w(z)g''(z))^2 \qquad \text{Equation 4}$$

where the first term satisfies Equation 3 and the second term imposes a smoothness constraint on the second derivative, such that:

$$g''(z)=g(z-1)+2g(z)-g(z+1) \qquad \text{Equation 5}$$

The weighting function, w, is given by Granados, M., Ajdin, B., Wand, M., Christian, T., Seidel, H.-P., & Lensch, H. P. (2010), Optimal HDR reconstruction with linear digital cameras, CVPR (pp. 215-222) San Francisco: IEEE.

$$w(z) = \begin{cases} z - Z_{min}, & z \leq \frac{1}{2}(Z_{max} + Z_{min}) \\ Z_{max} - z, & z > \frac{1}{2}(Z_{max} + Z_{min}) \end{cases} \quad \text{Equation 6}$$

Once the inverse camera response function is known, a map of the scene irradiance may be obtained from P images by weighting exposures, which produce intensities closer to the middle of the response function or another targeted set of criteria in intensity, chromaticity or any combination thereof:

$$\ln(E_i) = \frac{\sum_{j=1}^{P} w(Z_{ij})(g(Z_{ij}) - \ln(t_j))}{\sum_{j=1}^{P} w(Z_{ij})} \quad \text{Equation 7}$$

For a color sensor, the camera response function may be developed separately for each channel assuming that the channels respond equally to achromatic light. This means:

$$Z|Z \in \{R, G, B\} \quad \text{Equation 8}$$

where the response is given by:

$$R_{ij} = f_R(E_i \Delta t_j)$$

$$G_{ij} = f_G(E_i \Delta t_j)$$

$$B_{ij} = f_B(E_i \Delta t_j) \quad \text{Equation 9}$$

and the inverse response at a common exposure is given as:

$$g_R(R_{ij}) = \ln(E_{Ri}) + \ln(\Delta t_j)$$

$$g_G(G_{ij}) = \ln(E_{Gi}) + \ln(\Delta t_j)$$

$$g_B(B_{ij}) = \ln(E_{Bi}) + \ln(\Delta t_j) \quad \text{Equation 10}$$

Creating Synthetic Photographs from Exposures

Figure 10:
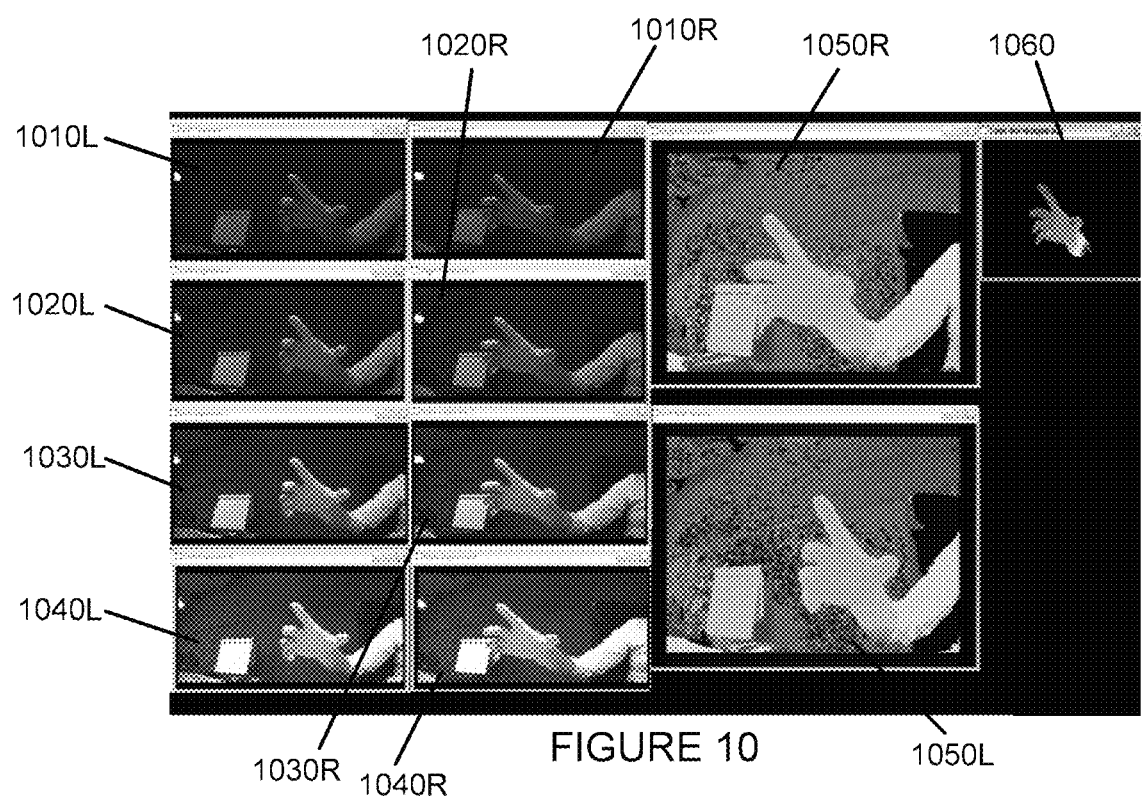
FIG. 10 shows four different source images at different exposure values; their associated reconstruction, and associated depth map.
Figure 11:
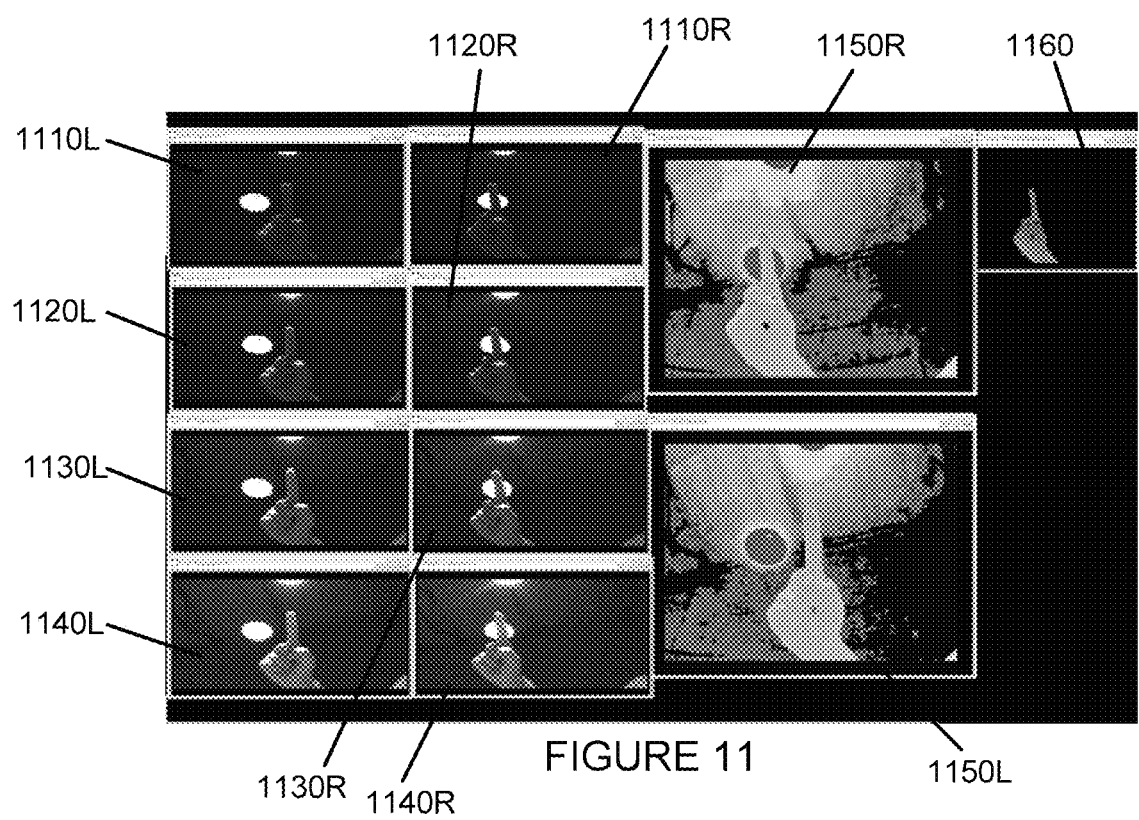
FIG. 11 shows an example of RGB reconstruction in the presence of a light source in the image.

Once the irradiance of each of the channels is known, the log-inverse camera response function may be used to compute the response of the sensor to a user-specified exposure, $\Delta t$, creating virtual photographs from a series of observations at different exposure values. An example of this process is depicted in FIGS. 10 and 11, described below.

Hence, a set of new channels, $R_i$, $G_i$, $B_i$, can be computed from an observed set of exposures, such that:

$$R_i \in g_R(R_i) = \ln(E_{Ri}) + \ln(\Delta t)$$

$$G_i \in g_G(G_i) = \ln(E_{Gi}) + \ln(\Delta t)$$

$$B_i \in g_B(B_i) = \ln(E_{Bi}) + \ln(\Delta t) \quad \text{Equation 11}$$

Equation 11 may be written more efficiently as:

$$R_i = g_R^{-1}(\ln(E_{Ri}\Delta t)) = f_R(E_{Ri}\Delta t)$$

$$G_i = g_G^{-1}(\ln(E_{Gi}\Delta t)) = f_G(E_{Gi}\Delta t)$$

$$B_i = g_B^{-1}(\ln(E_{Bi}\Delta t)) = f_B(E_{Bi}\Delta t) \quad \text{Equation 12}$$

Chromaticity Maximization and Color Consistency

With the ability to reconstruct images/pixels of a scene at any exposure value with an acceptable degree of accuracy, in accordance with various embodiments of the invention, a method with which one can extract the prevalent Hue value by viewing the region around the maximum Chromaticity that is associated with a given pixel is provided. Using the Camera Response Function, a method for maintaining robust color consistency throughout a scene by maximizing Chroma and plotting the values of hue that are associated with different Chroma values in the neighborhood of maximum Chroma is provided.

Maximizing Chromaticity

The exposure value(s) that maximize Chromaticity, $C_{ij}$, for a given pixel, within the constraints of a camera's response function, by maximizing the Chromaticity for a pixel at location (i,j) may be provided as:

$$\Delta t_{ij} = \underset{\Delta t_{ij}}{\arg\max} \, (C_{ij}) \quad \text{Equation 13}$$

where $\Delta t_{ij}$ is the exposure value that maximizes Chromaticity at location (i,j).

Note that, $C_{ij}$ is given by (Hanbury, 2008):

$$C_{ij} = \sqrt{\alpha_{ij}^2 + \beta_{ij}^2} \quad \text{Equation 14}$$

where $\alpha_{ij}$ and $\beta_{ij}$ are given by:

$$\alpha_{ij} = \frac{1}{2}(2R_{ij} - G_{ij} - B_{ij}) \quad \text{Equation 15}$$

$$\beta_{ij} = \frac{\sqrt{3}}{2}(G_{ij} - B_{ij})$$

Computing the exposure that would maximize the Chromaticity in Equation 13, then calculating the hue associated therewith allows for finding a hue that is relatively constant across multiple lighting intensities of the same illuminant, since each different intensity will have a set of exposure values that is associated with it. This approach may also be extended to multiple illuminants as will be described in greater depth below, by estimating the illuminant value that is associated with a given scene.

Different Tones and their Apparent Color

Figure 3:
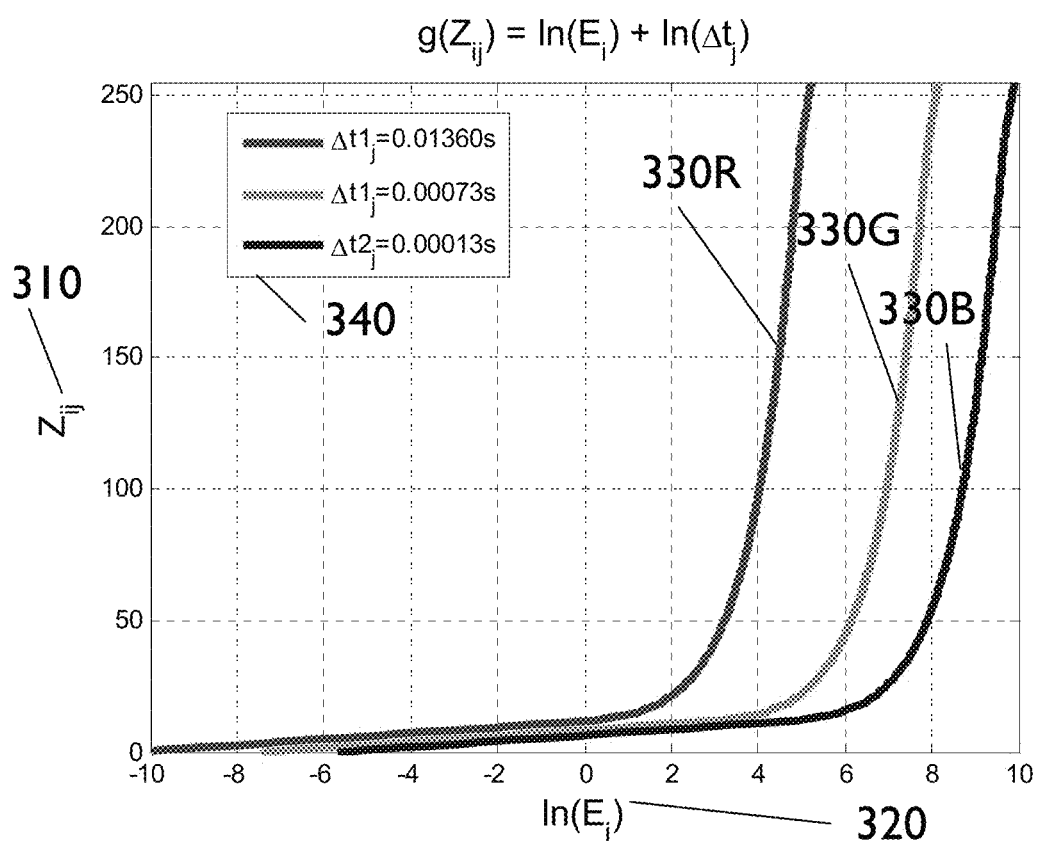
FIG. 3 depicts a graph representative of sampling irradiance at various exposures.
Figure 4:
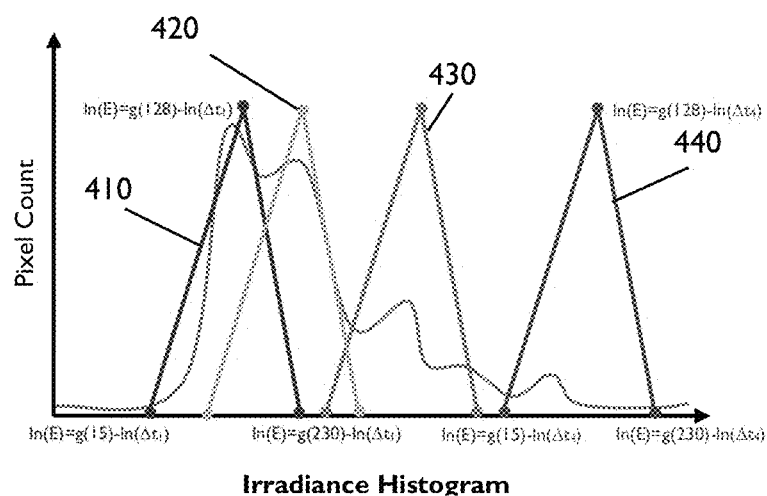
FIG. 4 depicts an irradiance histogram where the range irradiances associated with each exposure has been overlaid on the histogram.

Depending on an exposure value that is configured in one or more camera settings, different objects can appear to have colors that are very dissimilar from the perceived colors by observers. A problem arises in the definition of a perceived color in a field-of-view and how it relates to the colors that are associated with the object. However, observing the three channels of a pixel across a whole range of exposure values provides a better idea as to the object's true color, and not just the apparent color. Assuming that the lux that is incident at a certain scene is known, and assuming that the exposures that are associated with a given process to reconstruct lux are also known, it then becomes a significantly simpler problem to address estimation of the correct color. Hence, looking at a given set of exposure values and their associated images is a good way of identifying the different apparent colors that are associated with such images. An example Camera Response Function is presented in FIG. 1. As is shown in FIG. 1, the camera response function 110 is shown as a graph of intensity 120 versus the combined irradiance and exposure 130. The graph depicted in FIG. 3 depicts the same camera response function, broken into its component colors, red (330R), green (330G) and blue (330B) at a different exposure value. The curve of each camera response function 330R, 330G, 330B thus defines the range of irradiance 320 that can be reconstructed given the exposure value 340 and intensity 310. FIG. 4 depicts an example of irradiance sensitivity and associated histogram modes, representative of a more general example of the images shown in FIG. 3. Triangles 410, 420, 430, 440 represent ranges of good exposure recovery associated with various exposure settings, where the triangles indicate the irradiance recovered at a given pixel intensity.

Approximating the Camera Response Function with B-Splines

Another approach is to approximate the CRF with B-spline polynomials, such that a C2 continuous graph is presented. This is important to reduce the overall amount of data that is used to store the camera response function. The CRF may also be approximated with a best-fit log function.

Figure 2:
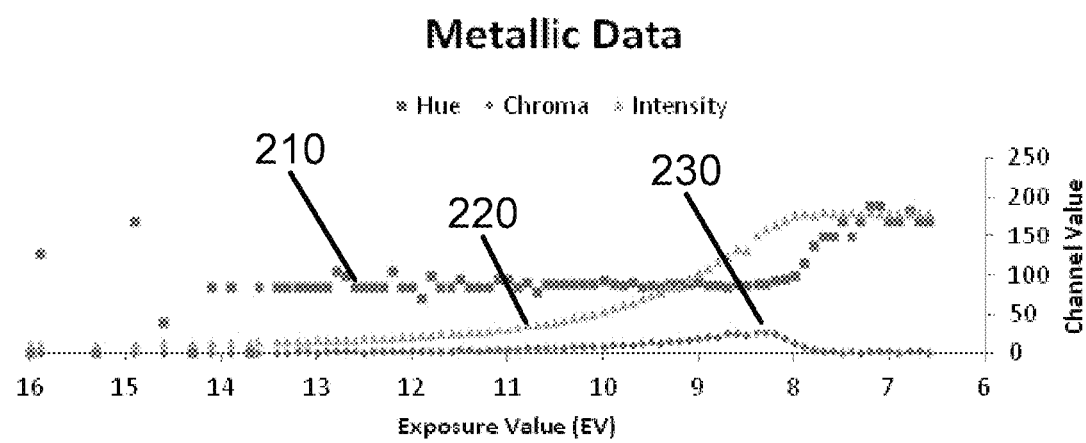
FIG. 2 is an example range of metallic data's hue, chroma and intensity values.

Adding Context to Chromaticity Maximization—Dealing with Gray and Metallic Objects Defining Relationships that are invariant to color temperature is essential to the identification of regions with high-reflectivity. Not every pixel will have high Chromaticity values; specifically pixels that are either too gray with naturally low Chromaticity, and pixels that belong to regions that are highly specular, both exhibit low Chromaticity. In photography, High Dynamic Range (HDR) imaging is used to control such cases, de-emphasizing specularities and over-exposing very dark regions. The intended consequence in both cases defines higher Chromaticity in both of these regions. We instead suggest a twist to HDR photography that not only allows it to run much faster, but makes it significantly friendlier to regions of higher Chromaticity, while de-emphasizing regions that are too bright (specular regions) or too dark. As an example, FIG. 2 highlights a case where metallic data may be perceived as highly specular. It has been determined by the inventors of the present invention that a significant amount of Chromaticity, as well as hue, can be obtained for a certain range of exposure values, albeit a small one. It is precisely for cases like these that a better understanding of hue and Chroma is needed, as well as how they are defined and what their non-zero support regions look like, specifically in the case of Chroma. As is shown in FIG. 2, hue 210, chroma 230 and intensity 220 are shown for different exposure values. It should be noted that a maximum value for each of these graphed variables is presented at particular exposure value. In FIG. 2, the maximum chroma is shown between an EV of 8 and 9 for this example.

Eliminating Reflectivity with the Camera Response Function

To identify reflectivity, it is important to address regions with such high reflectivity through the utilization of the CRF. Since colors can be returned that are associated with Exposure Values (EVs) that have been artificially enhanced. Note that the camera response function has a logarithmic nature that introduces various irradiance data reduction errors when the CRF, specifically in regions with dense irradiance information. This necessitates a non-uniform spacing of the exposures, Δt, used to reconstruct the irradiances, as illustrated in FIG. 3. When computing a maximum Chromaticity, it makes sense to try and pay special attention to regions of the CRF where irradiance information is dense, and to try and target slightly under-exposed reconstructions, especially outdoors. Irradiance sensitivity is better defined in slightly darker regions for most image sensors, allowing for a better image reconstruction. The irradiance error that is associated with the reconstruction can be calculated from the first derivative of the response function itself. Exposure settings can be chosen such that a finer quantization of the irradiance and more accuracy coincide with the most frequently repeated irradiances in the image, i.e. the statistical modes. This provides the most sensitivity at the most dominant irradiances in the field of view or region of interest, maximizing the signal to noise ratio. When the number of modes is less than the maximum number of exposures, the exposures can be placed closer together allowing the inherent averaging in the irradiance recovery to become more effective.

Irradiance Sensitivity and Exposure Settings

Figure 5:
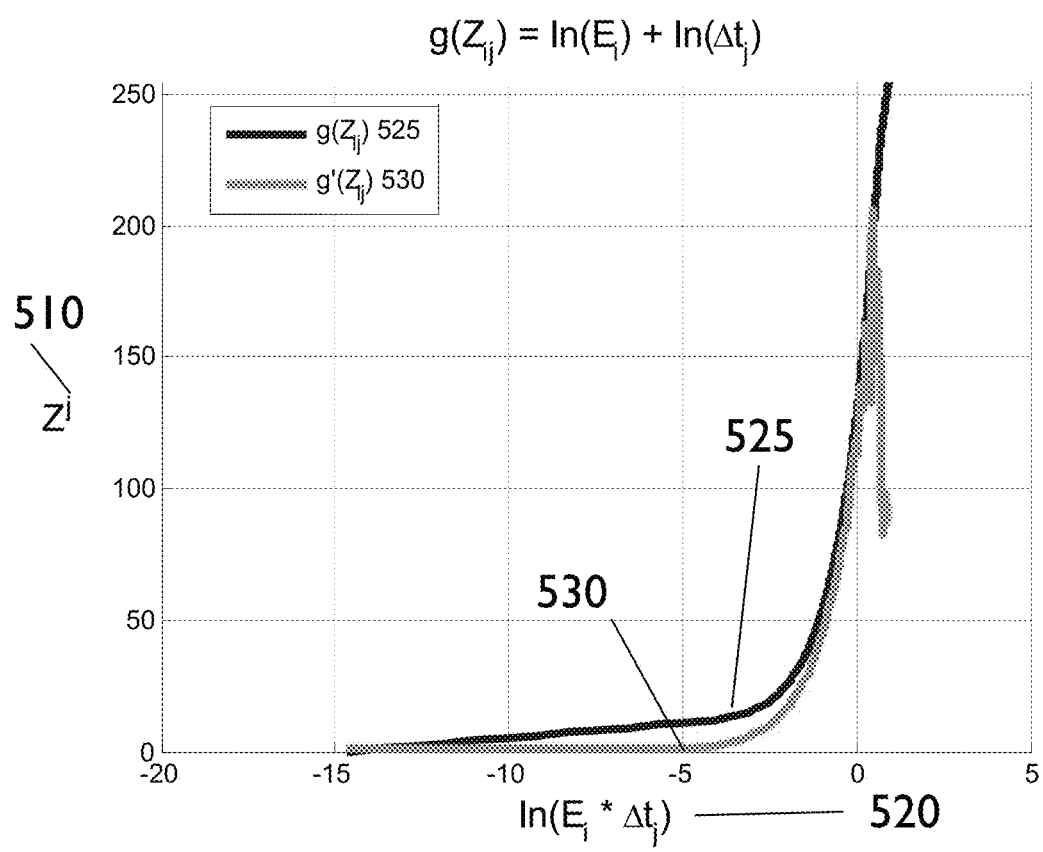
FIG. 5 is a graph depicting an exemplary camera response function and its associated first derivative.

Looking at the CRF's first derivative, the irradiance sensitivity is maximized where the first derivative is also maximized. As an example, FIG. 5 represents a CRF 520 as well as its first derivative 525. An intensity value is shown in the vertical axis 510, while the horizontal axis of the graph in FIG. 5 shows the log-irradiance 520 that is associated with it.

The maximum sensitivity, S, in irradiance as determined by the maximum of the first derivative, occurs at approximately Z=205 or g(Z)=0.5, where g represents the inverse CRF in accordance with a particular embodiment of the invention. However, this does not mean that in all situations the value to be chosen should be 205. Rather, a constraint will preferably be put in place, as will be described below, to address image quality and bring the value down to a range that is more consistent with visually acceptable image quality. So, chroma maximization will preferably be attempted selectively, i.e. maximizing chromaticity within a given set of constraints, one of which is maximum intensity that is associated with the data.

$$S=f'(g(z)) \qquad \text{Equation 16}$$

The log-exposure that produces the most sensitivity to a given irradiance can be computed as:

$$\ln(\Delta t)=g(\arg \max(f'(g(z))))-\ln(E) \qquad \text{Equation 17}$$

Irradiance Histogram Computation

The current approach to computing the irradiance histogram via the calculation of the CRF transforms the individual red, green, and blue irradiances into a grayscale irradiance using the grayscale conversion coefficients typically applied to pixel values, Ez=0.3Er+0.59Eg+0.11Eb. If the CRF were linear, this would be equivalent to the grayscale irradiance computed by first converting the pixels to grayscale, then applying the CRF, $$E_z=g(z)=g(0.3R+0.59G+0.11B) \qquad \text{Equation 18}$$

Since the CRF is non-linear, in accordance with embodiments of the invention, the grayscale irradiance should either be computed from a grayscale conversion of the demosaiced RGB values or taken directly from the Bayer pattern.

Both approaches assume that the grayscale irradiance adequately represents the per-channel irradiance. Although this assumption may be practical to simplify the process of synthetic data creation, it still discounts the fact that the differences between the irradiance channels drastically affect hue. Another option is to create an irradiance histogram over all channels simultaneously, such that the modes reflect the most dominant irradiances of all channels.

Relationship Between Modes and Exposure Settings

Figure 6:
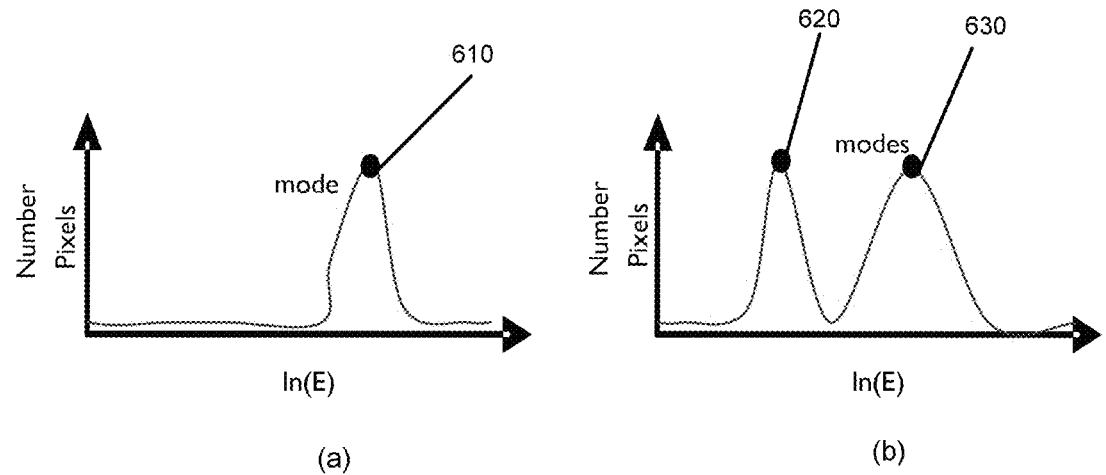
FIG. 6 is a graph depicting histogram-based mode identification.

In an irradiance histogram, a mode may be present around one or more local maxima. As an example, FIGS. 6(*a*) and 6(*b*) (collectively FIG. 6) below represents two such cases, with one mode 610 (FIG. 6(*a*)) and two modes 620, 630 (FIG. 6(*b*)), respectively. The graphs in FIG. 6 have been constructed by calculating the irradiance histograms of the two different cases. Ideally, each mode should coincide with an exposure setting that minimizes noise at the corresponding irradiance. Exception may occur under various conditions, including:

- If two or more modes occur close to each other (nearly identical irradiance) while one or more smaller modes (less pixels) occur at separate, distinct irradiances.
- If a mode appears at zero irradiance indicating that either scene is extremely dark or the irradiance is unrecoverable.

Figure 7:
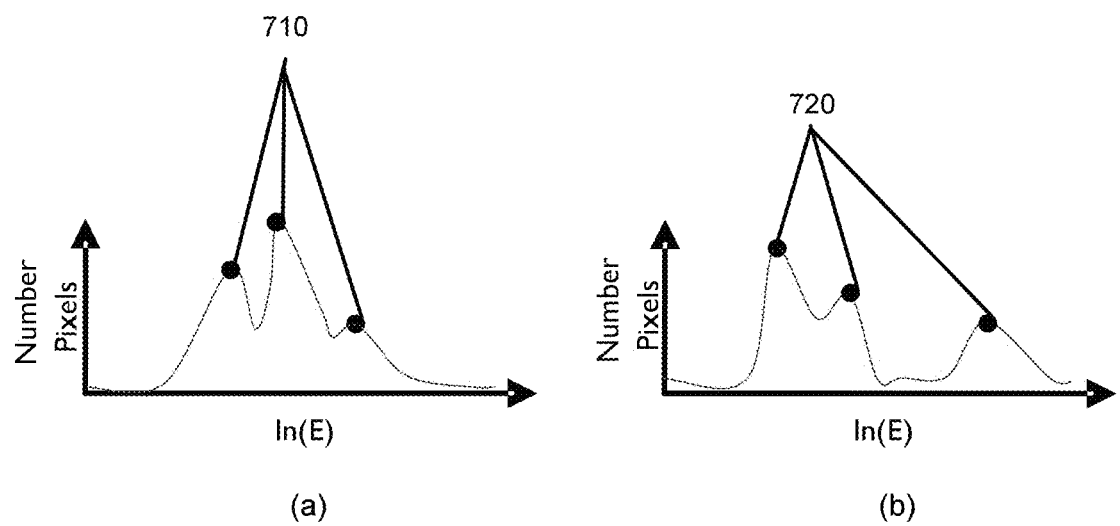
FIG. 7 is a graph depicting histogram mode identification as input to exposure setting.

In one exception, highlighted in FIGS. 7(a) and 7(b) (collectively FIG. 7), the exposure settings may be attached to modes occurring at independent locations. As is shown in FIG. 7, a number of local maxima 710, 720 are shown occurring in close proximity to each other. As a result, a lower number of exposure settings may be chosen, or the exposure settings may be chosen closer to each other.

Unrecoverable Irradiance

A problem with this approach occurs if the exposures that are used for computing the irradiances cannot recover certain ranges of irradiances. This can occur when the scene changes too drastically and the exposures clip or saturate one or more of the source images. One option is to set such pixels' associated irradiances to either zero or 255, representing a means with which to mitigate the associated effects. This is a reasonable assumption to make since the associated source values, i.e. from the source images at different exposure settings, are too extreme on one side of the intensity range or the other. The rationale behind this issue stems from the fact that, given proper exposures, irradiances that are deemed unrecoverable are too low, representing pixels that are near zero in intensity, and hence have very little pixel information that is associated with them. These irradiances can also be too high, i.e. representing specularities in the field of view where the pixel's intensity in one or more of the three channels is too high for the observations that are associated with an exposure range. In this case, a multilinear constraint on dichromatic planes (Toro & Funt, 2007) may be used to first estimate the illuminant and then remove illuminant effects from the scene, to prevent artificial colors from occurring. Either way, recovering the irradiance would then require more than the method that is described so far and would require an understanding of the illuminant that is associated with the scene, as well as eliminating it.

Histogram Cases

Figure 17:
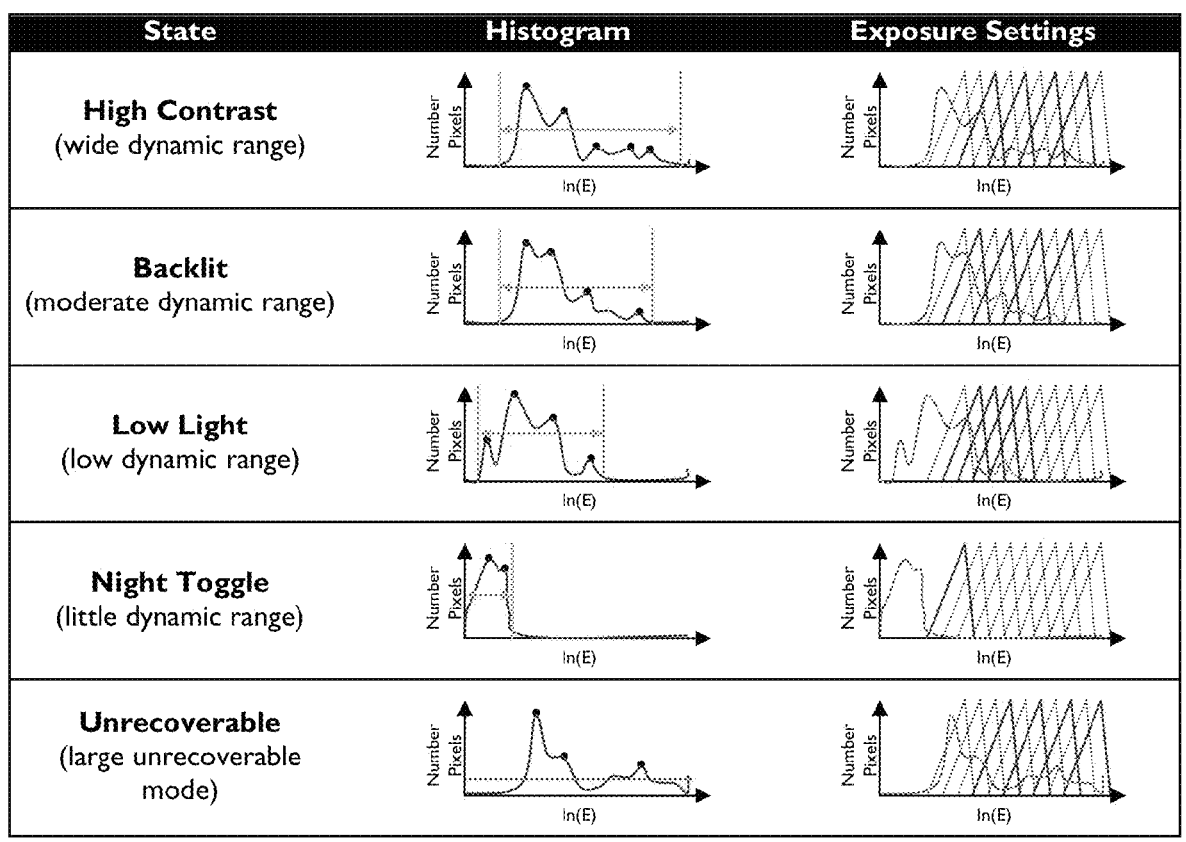
FIG. 17 depicts a number of exemplary histogram cases and associated irradiances and exposure settings.

Cases of different histogram distributions, as well as the lighting conditions that are associated with them, are presented in FIG. 17. The second column depicts representative histograms of such cases, with the third column depicting four overlaid rolling exposure settings, as well as the theoretical set of exposures that can be computed via the observations and the CRF. As is shown in FIG. 17, the different histogram distributions may include any number of different possible lighting conditions. In particular, lighting conditions representing high contrast, backlit, low light, night toggle and unrecoverable are shown. As can be seen in the high contrast case, pixel responses are computed over a wide range of exposures, thus reducing the overall average response function. The exposure settings are hence set over a large range of values to cover a wider dynamic range. The second graph depicts a backlit case, with moderate contrast lighting. As can be seen, pixel responses are provided over a more limited range of exposure values, thus reducing the overall dynamic range of the scene, but increasing the average intensity over the available range. Exposure settings are similarly reduced to cover this reduced dynamic range as use of exposure settings outside of the acceptable range will fail to provide additional pixel information. This reduction in dynamic range is further shown in the third graph of FIG. 17, depicting a low lux environment in which the range of exposure values is further reduced, while still raising the overall intensity over the available dynamic range. An even further reduced dynamic range is shown in the "night toggle" state, with a corresponding higher average intensity over the dynamic range. A single exposure setting, or fewer exposure settings, may be employed to address the reduced dynamic range. Also shown are unrecoverable pixels, i.e. pixels which are too bright or too dark, over multiple exposures, to have their actual values recovered correctly. These pixels may be disregarded in the various calculations.

Auto Exposure Bracketing

Auto Exposure bracketing is a means of capturing high dynamic range (HDR) images from a set of low-dynamic range images at different exposure settings. This is a prevalent technique in photography in which multiple images are taken, typically three, one with an optimal exposure setting, with a second image being taken at a lower EV value, and a third image being taken at a higher EV value. The idea is to try and get as much dynamic range of the scene as possible with a single image, and then use the other images to fill in any missing information, by over-exposing dark regions or under-exposing really bright regions.

As mentioned earlier, High Dynamic Range imaging is critical for photography. HDR is used in a number of instances. Auto-exposure bracketing techniques are very prevalent in industry (Canon U.S.A., Inc., 2012), academia (Robertson, Borman, & Stevenson, 2003), and in patents and patent applications (Yeo & Tay, 2009).

Some Common Assumptions and Weaknesses

Almost every AEB technique requires a known intensity histogram (Ohsawa, 1990). Some may also require a known irradiance histogram (Guthier, Kopf, & Effelsberg, 2012) as well. However, if the histogram is not adequately covering pertinent values in the scene, then the AEB technique will converge on the wrong settings. Also, if the histogram covers regions belonging to the background, instead of the region of interest, the AEB algorithm will converge on exposures that don't capture the dynamic range of values of the targeted ROI.

A Control Algorithm for Recovering Max Chromaticity Images

Figure 8:
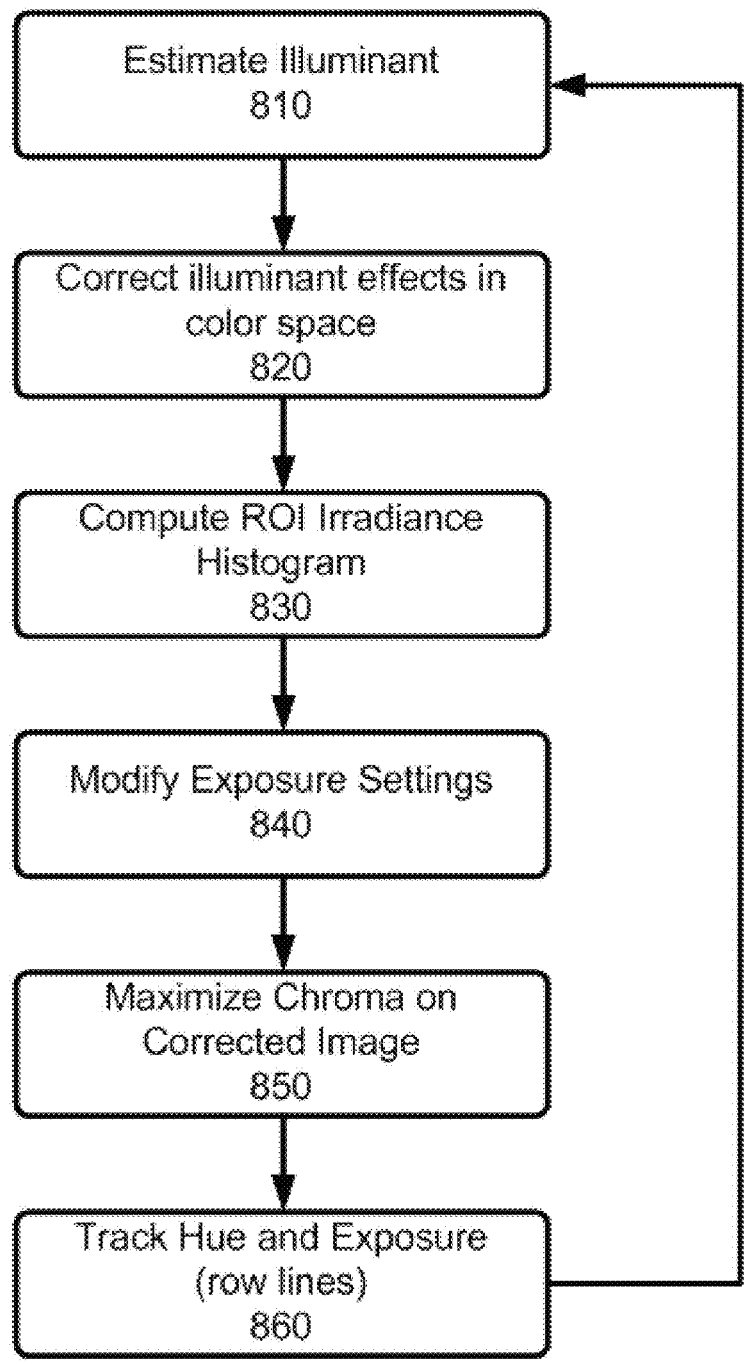
FIG. 8 is a flowchart diagram depicting a control algorithm.
Figure 9:
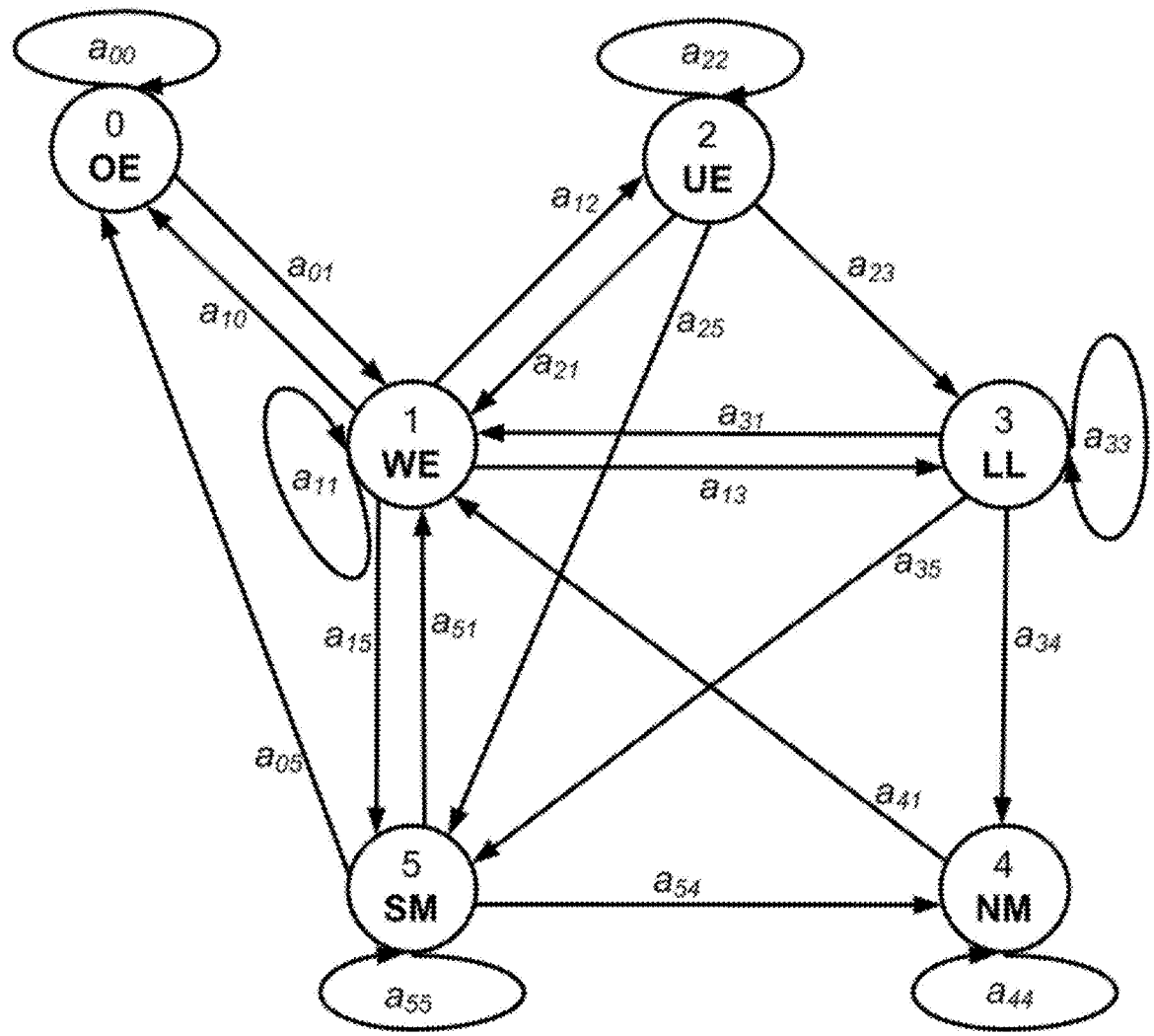
FIG. 9 is a state diagram representing the control algorithm of FIG. 8 employed for automatic exposure bracketing and exposure correction.

Therefore, in accordance with one or more embodiments of the present invention, a new approach that can take advantage of chromaticity maximization under resilient hue conditions, while maintaining a robust exposure bracketing algorithm is presented. This approach is depicted in FIG. 8. In step 810 the illuminant is first estimated, via an estimation of its color temperature, determined in accordance with a method presented below. Once the illuminant is estimated, the color space is preferably rectified to account for the illuminant's effects on the scene at step 820. A region-of-interest (ROI) preferably defined in the scene, and the irradiance histogram, as described above, may be computed in step 830. Exposure settings are preferably modified in step 840, per the exposure control algorithm that will be described below, and as depicted in FIG. 9. Chromaticity may then be maximized in step 850, and the various input settings (such as hue and chroma, as well as any further desired values are preferably tracked in real-time in step 860. The input settings will also be described below.

Control Algorithm for Adaptive Pixel-Based Irradiance Estimation

A control algorithm provided in accordance with one or more embodiments of the present invention can now be used to describe the scene. FIG. 9 highlights the state diagram of the control algorithm. Six states are defined in the control algorithm:

UE—Under exposed: stands for scenes that are underexposed and whose exposure values need to be increased to compensate for such a case.

OE—Over exposed: stands for scenes that are overexposed and whose exposure values need to be decreased to compensate for too much irradiance in the scene.

WE—Well-exposed: stands for scenes that are well-defined with a quality dynamic range defined by exposures that cover most of the scene.

LL—Low lux: this stands for scenes (generally under 500 Lux) with a limited dynamic range that requires fewer exposures to recover irradiance.

NM—Night mode: this is an extension of the low-lux case (under 20 Lux) where a dual mode sensor may choose to turn on infrared LEDs for operating the system. NM can be accessed from the LL or SM states.

SM—Scan mode: represents a state where the system searches through the set or subset of available exposures to optimize settings for a new scene.

In accordance with an embodiment of the invention, additionally defined transition criteria based on the presence of underexposed as well as over exposed pixels, the mean of the irradiance distribution, the support window for the hue distribution, and the overall chroma distribution are preferably employed. As is shown in FIG. 9, a more detailed overview of the different cases is provided. FIG. 9 presents a state diagram representation of the control algorithm that is used for Automatic Exposure Bracketing and exposure correction. Implementation of rolling exposures in accordance with one or more embodiments of the invention including three fundamental states Under Exposed, Well Exposed and Over Exposed, as well as Low Lux, Scan Mode, and Night Mode, is also illustrated. As is shown in FIG. 9, an image that is well exposed (WE) may transition to either under exposed (UE), over exposed (OE), low lux (LL), or stay in the its well exposed (WE) state. Any image may of course also stay in its current state. Low lux (LL) images may be transitioned to night mode (NM) which will persist until the image is transitioned to well exposed (WE). All states may transition to a scan mode (SM) (except from night mode (NM). Once the scan is completed, the image will transition to either well exposed (WE) or night mode (NM). Thus, depending on various threshold conditions, the AEB state machine will transition between the various states. The AEB state machine will also vary the exposure value spacing, number of exposures, as well as the thresholds themselves, depending on the state. Note that in FIG. 9, very low irradiances are truncated to zero, and very high irradiances are truncated to 255, denoted as b0 and b255 respectively.

Example Source and Output Images

As an example, FIG. 10 depicts an embodiment in which four images are captured at different exposure values. As is shown, a first pair of images 1010L, 1010R is taken by a pair of stereo cameras at a first exposure value. Next, a second pair of images 1020L, 1020R are taken, preferably by the same pair of stereo cameras, As is further shown in this particular embodiment, third and fourth pairs of images 1030L, 1030R and 1040L, 1040R are also taken. Of course, any particular desired number of images may be employed. Furthermore, a single or multiple cameras may be employed for each set of images at each exposure level. The four left images (or any desired subset thereof) may then be employed to reconstruct image 1050L, while the four right images (or any subset thereof) may then be employed to reconstruct image 1050R. Finally, these reconstructed images are then presented using the camera response function and observations from all of the capture images in accordance with the method noted above, and a depth map 1060 is preferably generated.

A second example is shown in FIG. 11. In FIG. 11, depth is possible to be reconstructed despite the presence of a direct light source in the field-of-view. The light source's is minimized and the rolling exposures help compute the most suitable chromaticity-maximized value. Similar to FIG. 11, a first pair of images 1110L, 1110R are taken by a pair of stereo cameras at a first exposure value. Next, a second pair of images 1120L, 1120R are taken, preferably by the same pair of stereo cameras, As is further shown in this particular embodiment, third and fourth pairs of images 1130L, 1130R and 1140L, 1140R are also taken. Of course, any particular desired number of images may be employed. Furthermore, a single or multiple cameras may be employed for each set of images at each exposure level. The four left images (or any desired subset thereof) may then be employed to reconstruct image 1150L, while the four right images (or any subset thereof) may then be employed to reconstruct image 1150R. Finally, these reconstructed images are then presented using the camera response function and observations from all of the capture images in accordance with the method noted above, and a depth map 1160 is preferably generated.

Ensembles of Illuminants for a Given Scene and their Temperature Estimation

Estimating the illuminant is critical to accounting for it in a given scene and correcting the RGB color space, per the effects of the illuminant (Gijsenij, Gevers, & Weijer, 2011). Black body radiators are ones that emit light when excited at different temperatures. One can look at regular light sources as black body radiators. These vary from red to white, according to the temperature that is associated with their light color, in Kelvins. Typical temperature ranges vary from 2000K (red) to 9000K (blue/white or white with blue tint).

A set of illuminants may be defined based on values that are associated with their respective color temperatures (usually defined in Kelvins). In a manner similar to what has been defined in (Barnard, Cardei, & Funt, 2002), each illuminant may be defined according to its Chromaticity map, and may be expanded to include a more substantive set of illuminants. As a result, to find an approximate illuminant, the Veronese map of degree n may be computed, such that $$c(x)^T v = 0 \qquad \text{Equation 19}$$

where c(x) is an observed color belonging to a single material and v is a normal vector associated with the dichromatic plane of the material. The projection of the observed color is projected as:

$$d(x;w)^T = M(w)^T c(x)$$

$$d(x;w) = M(w)^T c(x) \qquad \text{Equation 20}$$

where w is a vector representing the color of the illuminant and d(x;w) represents the projection of the observed color c(x) onto a 2-D subspace using the 3×2 projection matrix M(w). The 2-D subspace is orthogonal to the light vector.

$$d(x;w)^T u = 0 \qquad \text{Equation 21}$$

where u is a vector in the 2-D subspace that consists of the coefficients of a linear combination.

$$\prod_{i=1}^{n} d(x; w)^T u_i = 0 \qquad \text{Equation 22}$$

$$\text{where } v_n(d) = [d_1^n \quad d_1^{n-1}d_2^1 \quad d_1^{n-2}d_2^2 \quad \ldots \quad d_2^n]^T$$

where $v_n(d) = [d_1{}^n d_1{}^{n-1} d_2{}^1 d_1{}^{n-2} d_2{}^2 \ldots d_2{}^n]^T$
$u_i$ is one vector in a collection of n vectors that represent all of the materials in the scene.

$$v_n(d) = [d_1{}^n d_1{}^{n-1} d_2{}^1 d_1{}^{n-2} d_2{}^2 \ldots d_2{}^n]^T \qquad \text{Equation 23}$$

where $d_1$ and $d_2$ are the 2-D coordinates of the projected color onto the subspace that is orthogonal to the light vector and $v_n(d)$ is the Veronese map of degree n and n is the number of materials in the scene.

$$\Lambda_n = \begin{bmatrix} v_n(d(x_1; w))^T \\ v_n(d(x_2; w))^T \\ \vdots \\ v_n(d(x_m; w))^T \end{bmatrix} \qquad \text{Equation 24}$$

where $\Lambda_n$ consists of the Veronese maps for all of the colors under consideration.

$$\min_{u_1 \ldots u_n} \sum_{x_j} \left( \prod_{i=1}^{n} d(x_j; w)^T u_i \right)^2 = \qquad \text{Equation 25}$$

Equation 25 can now be rewritten as:

$$\min_{a} a_n \Lambda_n^T \Lambda_n a_n \qquad \text{Equation 26}$$

where $a_n$ is the set of coefficients associated with each Veronese map in $\Lambda_n$.

As mentioned in, Toro, J., & Funt, B. B. (2007). A multi-linear constraint on dichromatic planes for illumination estimation. IEEE Trans. Image Processing, 16 (1), 92-97, a candidate color, w, is the actual color of the light if the smallest eigenvalue of matrix, $\Lambda_n^T \Lambda_n$, is equal to zero. Hence, the approximate illuminant is identified as the one corresponding to the smallest eigenvalue. To choose from the different materials, one approach can be applied where scenes are subdivided into various regions, based on both color as well as texture. A system for performing this approach may comprise any number of region classification schemes, and in a preferred embodiment, a system such as that described in U.S. patent application Ser. No. 12/784,123, currently pending, the contents thereof being incorporated herein by reference. Hence, an image is preferably broken up into regions of dominant texture or color, with multiple segments representing different blocks of data being present in any given image. For each block, the illuminant estimation process is conducted, such that the temperature of the illuminant is computed, as well as the associated RGB values. The color space of the image is then rectified to mitigate the illuminant's effects. The rest of the software stack follows from this step, to reconstruct segments followed by depth reconstruction, as described in U.S. patent application Ser. Nos. 12/784,123; 12/784,022; 13/025,038; 13/025,055; 13/025,070; 13/297,029; 13/297,144; 13/294,481; and 13/316,606, the entire contents of each of these application being incorporated herein by reference.

Example Approach to Illuminant Estimate

Figure 12A:
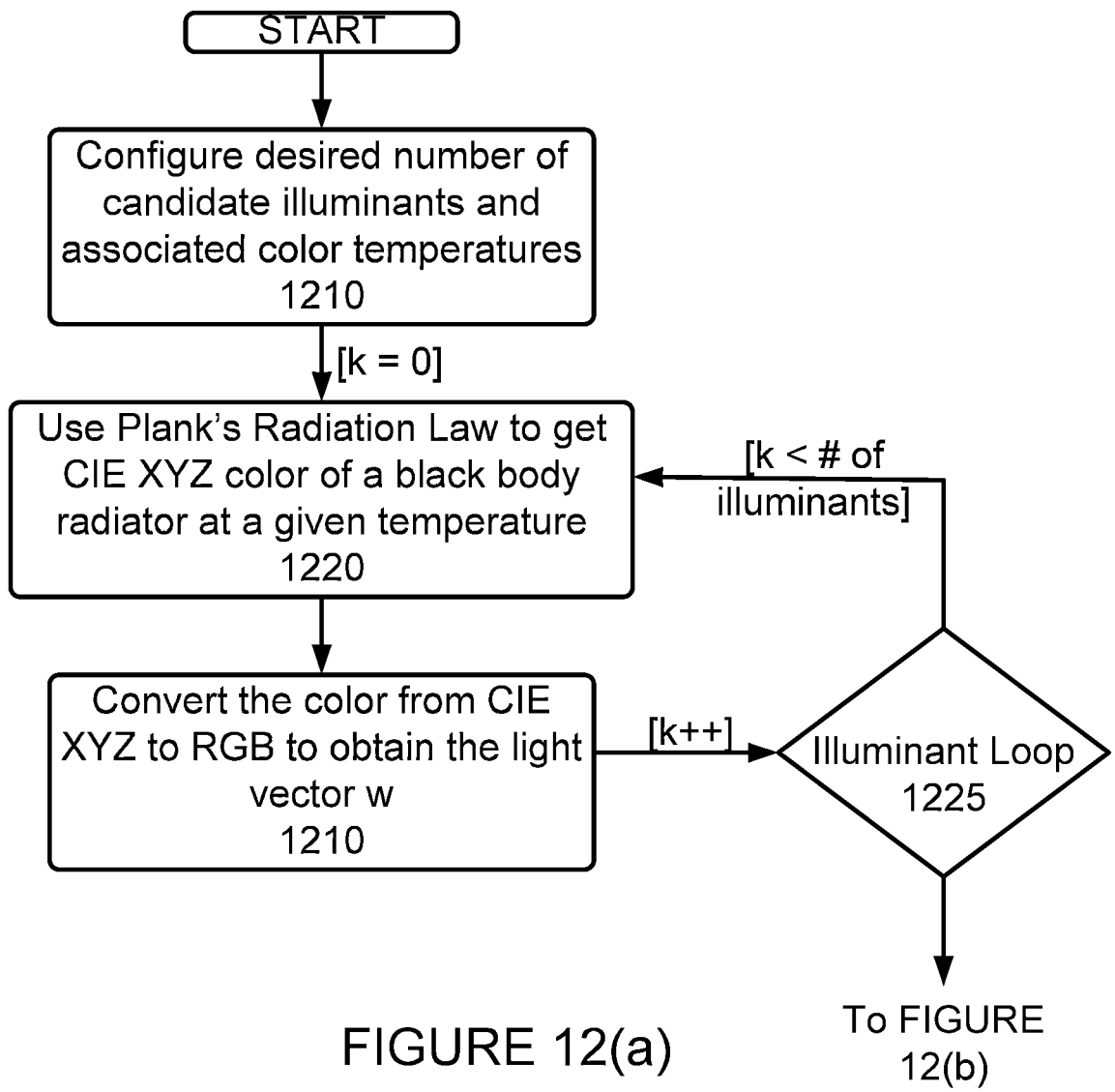
FIGS. 12(*a*) and 12(*b*) (collectively FIG. 12) are flowchart diagrams representing an activity diagram associated with implementation of an illuminant estimate.
Figure 12B:
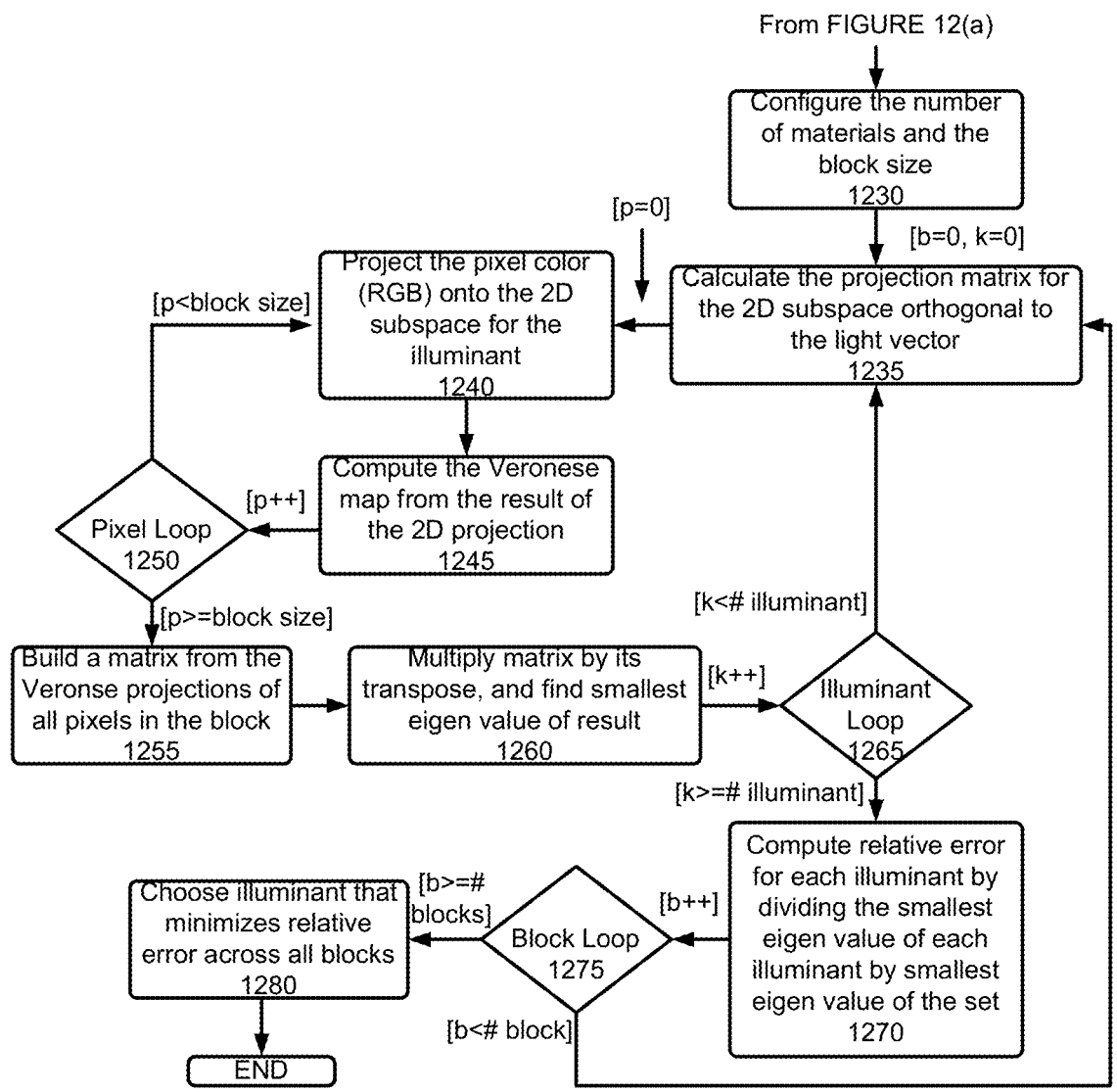

Referring next to FIGS. 12(a) and 12(b) (in combination referred to as FIG. 12), an approach to illuminant estimation is described, as presented in (Toro & Funt, 2007) and adapted here in accordance with the various embodiments of the invention. As is shown in FIG. 12, at step 1210, a desired number of candidate illuminant estimates as well as their desired color temperatures may first be configured. The blackbody radiator color may then be obtained at step 1215. The color is then preferably converted from CIE XYZ to RGB at step 1220. On an image level, the total number of materials as well as the block size that is associated with each material may also be configured, and therefore, at step 1225 it is questioned whether the process has been performed for all (or substantially all) desired candidate illuminants. If this inquiry is answered in the negative, and it has therefore been determined that not all of the desired candidate illuminants have been considered, processing preferably returns to step 1215, and processing for a next desired illuminate candidate begins.

If the inquiry at step 1225 is instead answered in the positive, and it is therefore determined that all desired candidate illuminants have been considered, processing then passes to step 1230 where the number of materials and block size are configured. Next, at step 1235, a projection matrix for the two-dimensional subspace orthogonal to a light vector may be computed, preferably employing the relevant equations described above. Then for each pixel defined in the two dimensional subspace, at step 1240, the pixel color is then preferably projected onto the subspaces of illuminants preferably according to Equation 5 described above, and at step 1245 a Veronese map from the result of the projections may then be computed, preferably employing Equation 8 noted above. Processing then continues to step 1250 where it is questioned whether the processing associated with steps 1240 and 1245 has been performed for each pixel (or substantially each pixel) in a defined block, or section of the image under observation. If this inquiry is answered in the negative, and it is determined that processing has not been completed for all desired pixels, processing returns to step 1240 for addressing a next pixel.

If on the other hand, if the inquiry at step 1250 is answered in the affirmative, and it is therefore determined that processing has been completed for all desired pixels, processing then passes to step 1255, where a matrix is preferably then built from the Veronese projections of all the pixels in a given block of the image, preferably employing Equation 10 described above. At a next step 1260, the resultant matrix is then multiplied by its transpose, the eigen values of the results being computed, and the smallest eigenvalue is obtained, preferably in accordance with Equation 11 described above. Processing then passes to step 1265 where it is questioned whether processing for all desired candidate illuminants (or substantially all desired candidate illuminants) for the current block has been completed. If the inquiry at step 1265 is answered in the negative, and therefore it is determined that processing has not been completed for all desired candidate illuminants for the current block, processing returns to step 1235 for a next of the desired candidate illuminant values for the current block.

If on the other hand, the inquiry at step 1265 is answered in the affirmative, thus confirming that processing has been completed for all of the desired candidate illuminants for the current block, processing then passes to step 1270 where the relative error is preferably computed for each illuminant by dividing the smallest eigenvalue of each illuminant by the eigenvalue of the set. Processing then passes to step 1275, where it is questioned whether processing for all blocks (or substantially all blocks) in the image has been completed. If this inquiry is answered in the negative, and it is therefore determined that processing for all blocks in the image has not been completed, processing once again returns to step 1235 for a next block in the image.

If on the other hand the inquiry at step 1275 is answered in the affirmative, and it is therefore determined that processing for all blocks in the image has been completed, processing then passes to step 1280 where an illuminant that minimizes relative error across all of the blocks is chosen.

Many other variants to this approach are contemplated in accordance with the various embodiments of the invention. For the sake of consistency and to enable visualization, the next following description should be considered applicable to two-dimensional as well as three-dimensional visualizations of the resultant light vectors in RGB space, while the three-dimensional implementation will be described.

Three-Dimensional Visualization of the Light Vector Relative to the RGB Space

Figure 13A:
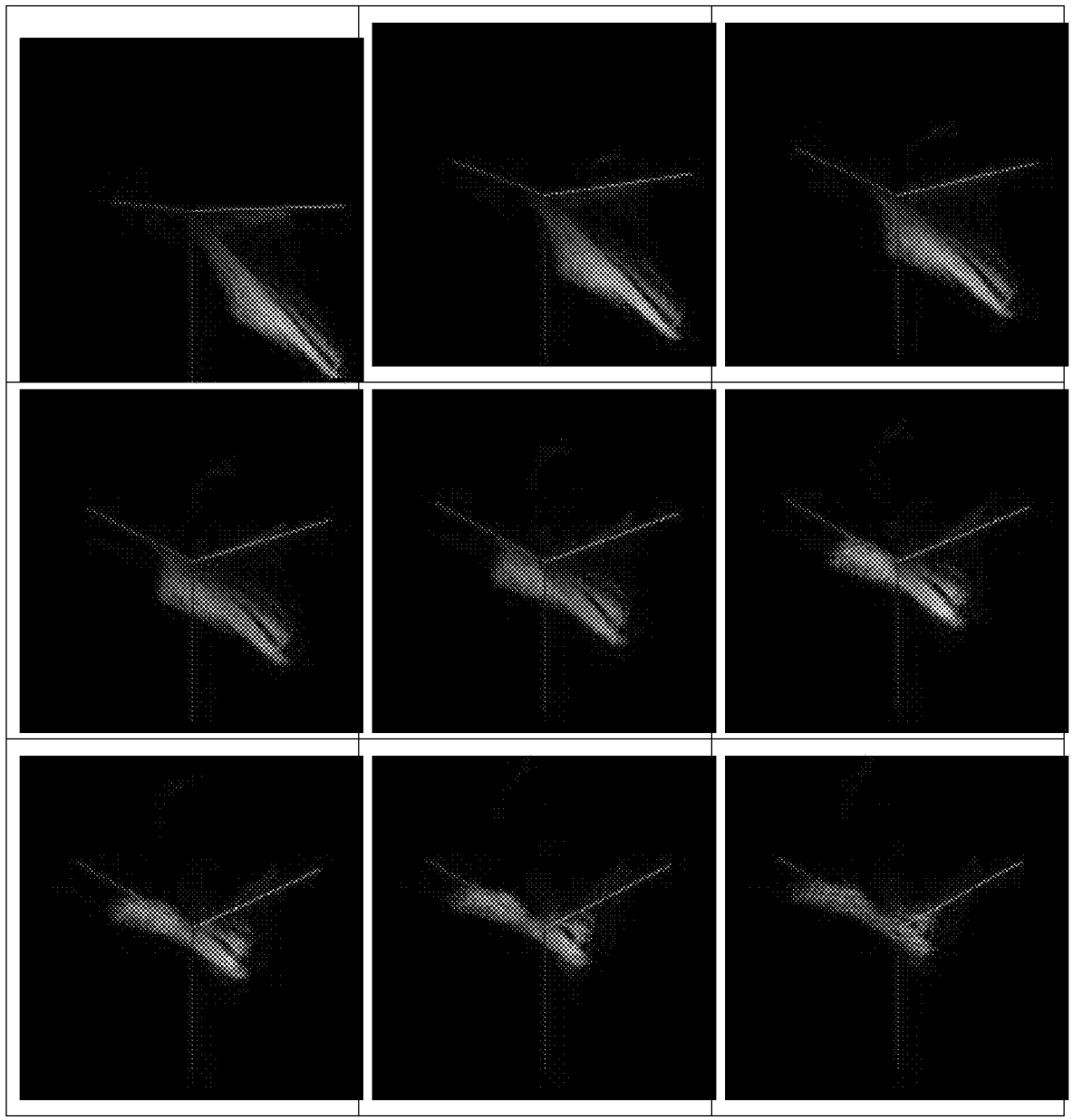
FIGS. 13(*a*) and 13(*b*) depict two-dimensional cross-sections of RGB data at different light temperatures.
Figure 13B:
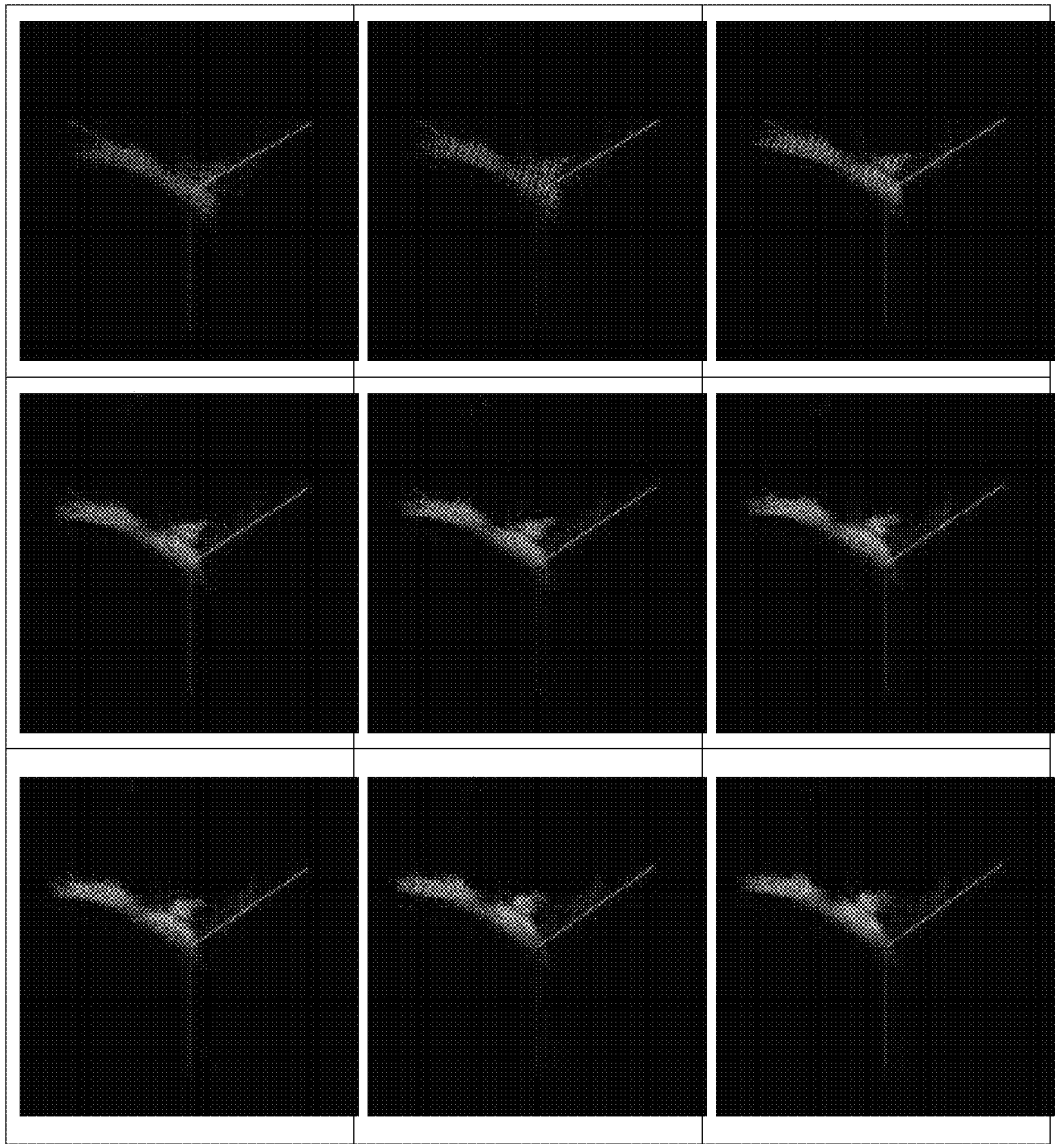
Figure 14:
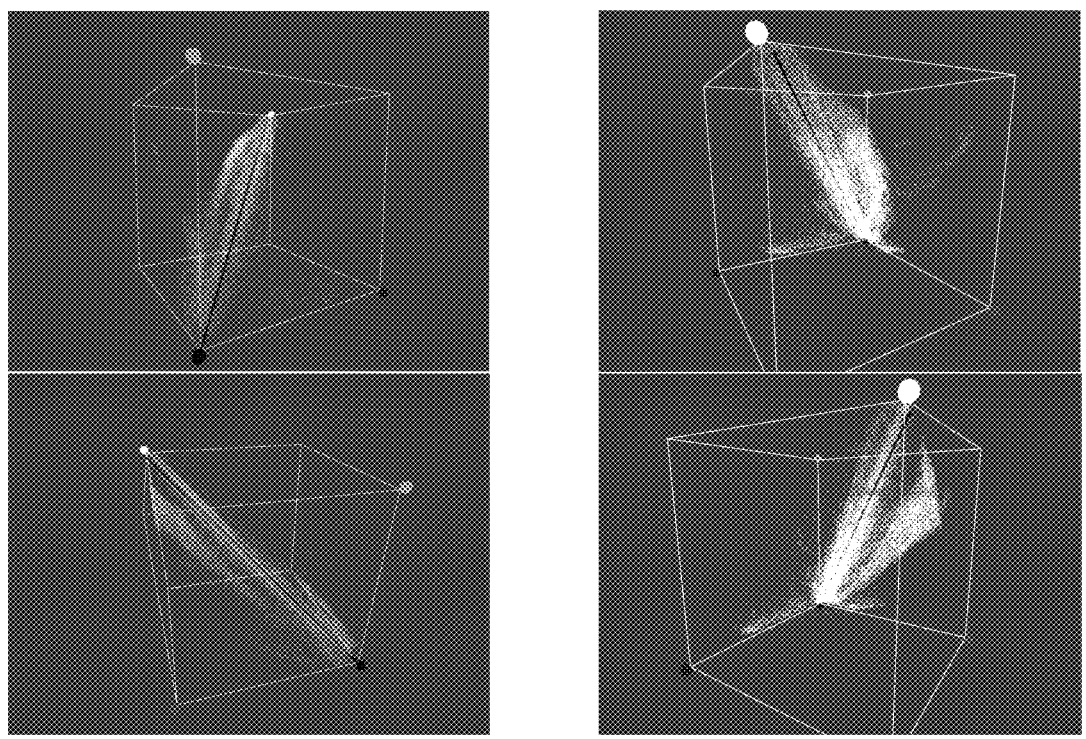
FIG. 14 depicts a number of three-dimensional representations of the illuminant estimation of FIG. 13 of approximately 6000K within an RGB cube.
Figure 15A:
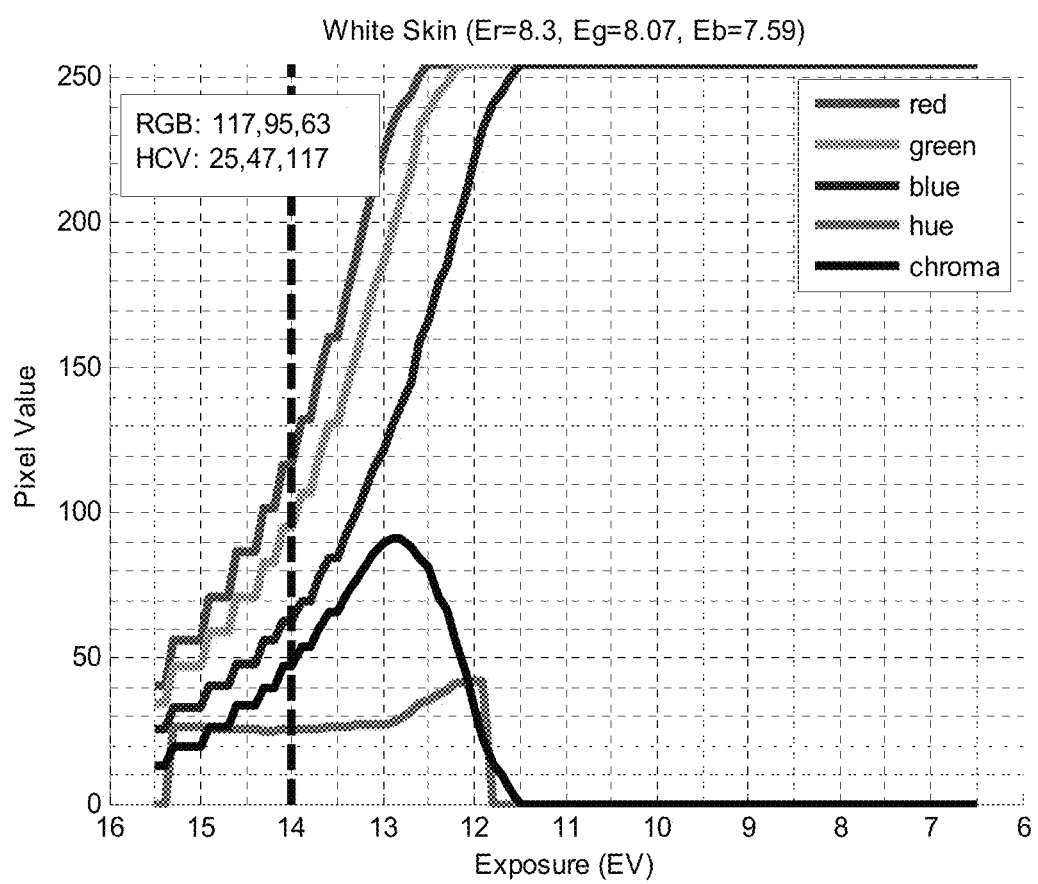
FIGS. 15(*a*)-15(*f*) comprise a set of graphs depicting highlights of skin tone with and without white balancing under different illuminant conditions.
Figure 15B:
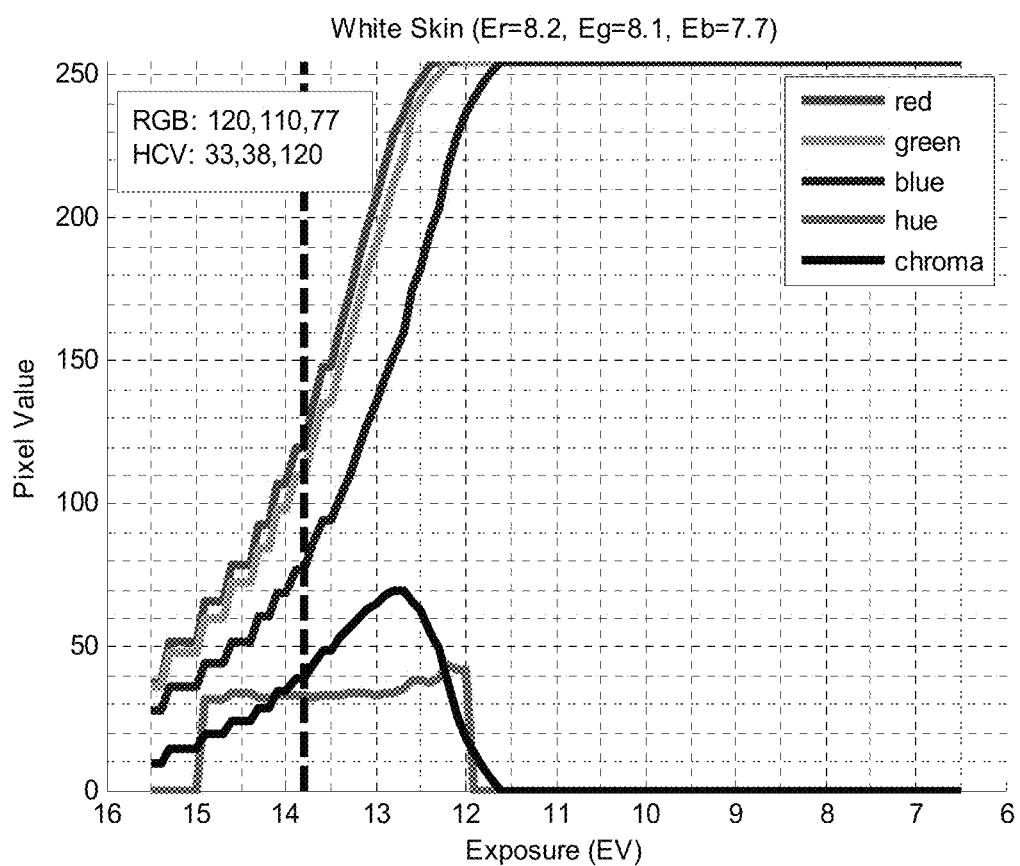
Figure 15C:
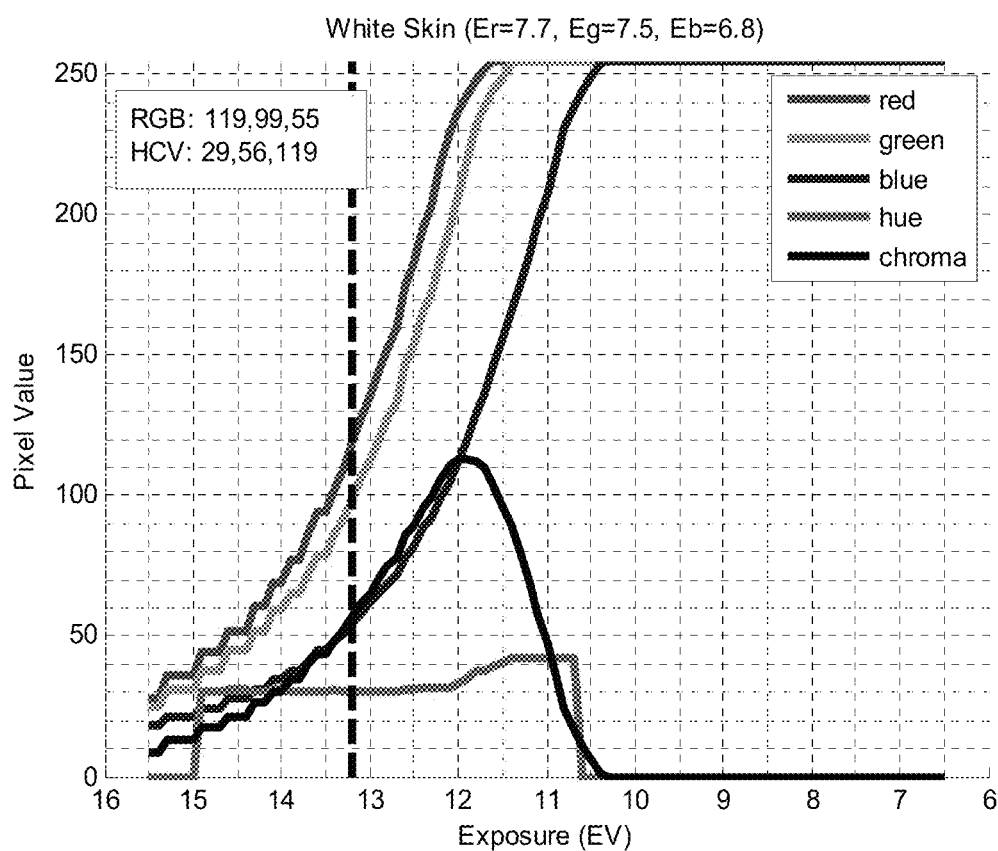
Figure 15D:
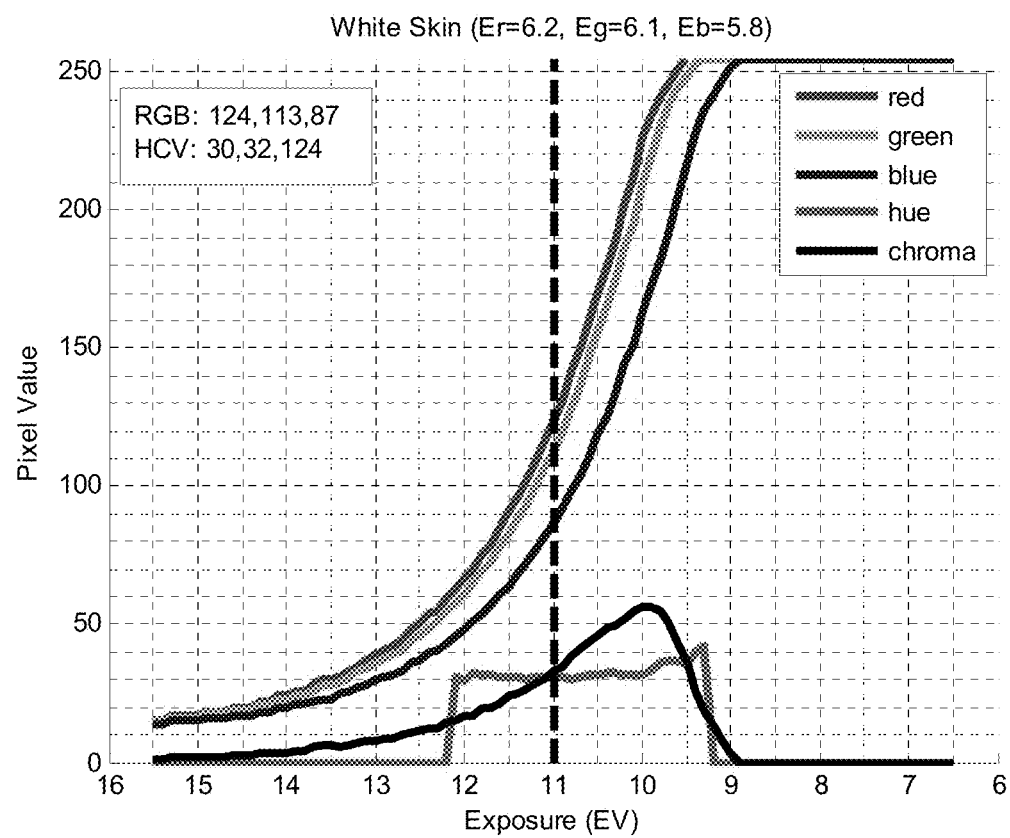
Figure 15E:
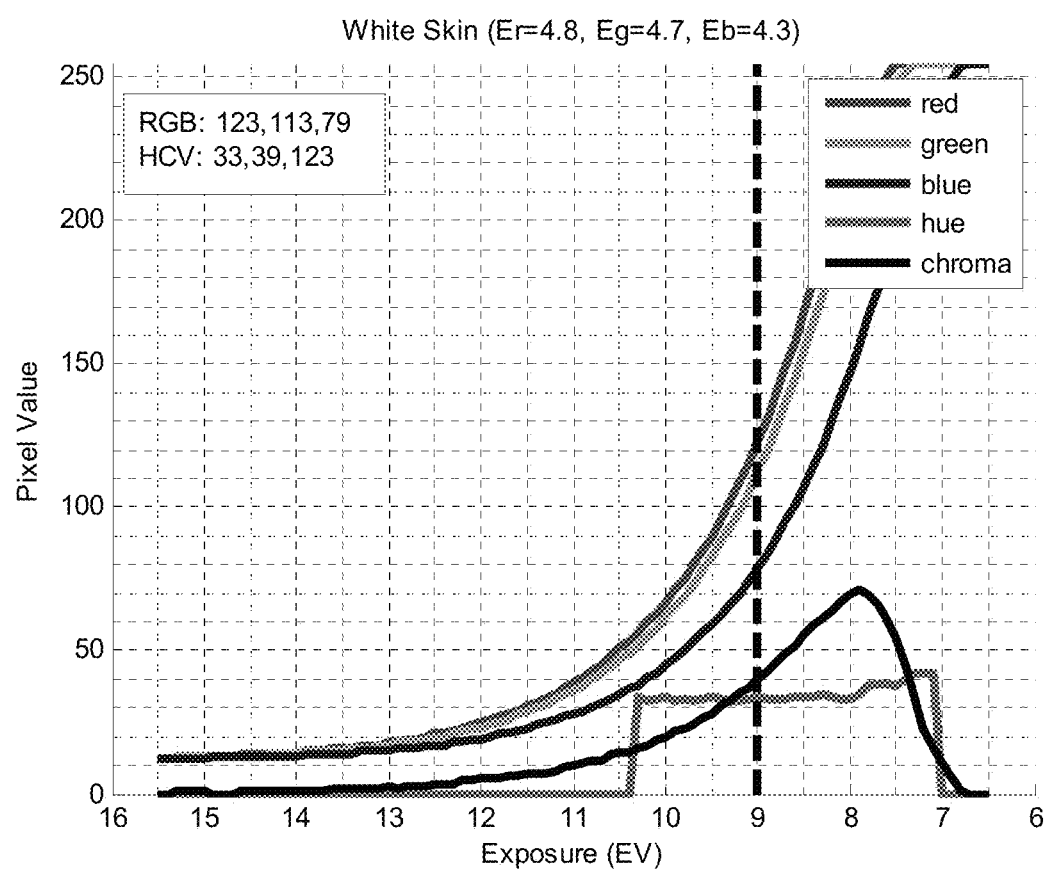
Figure 15F:
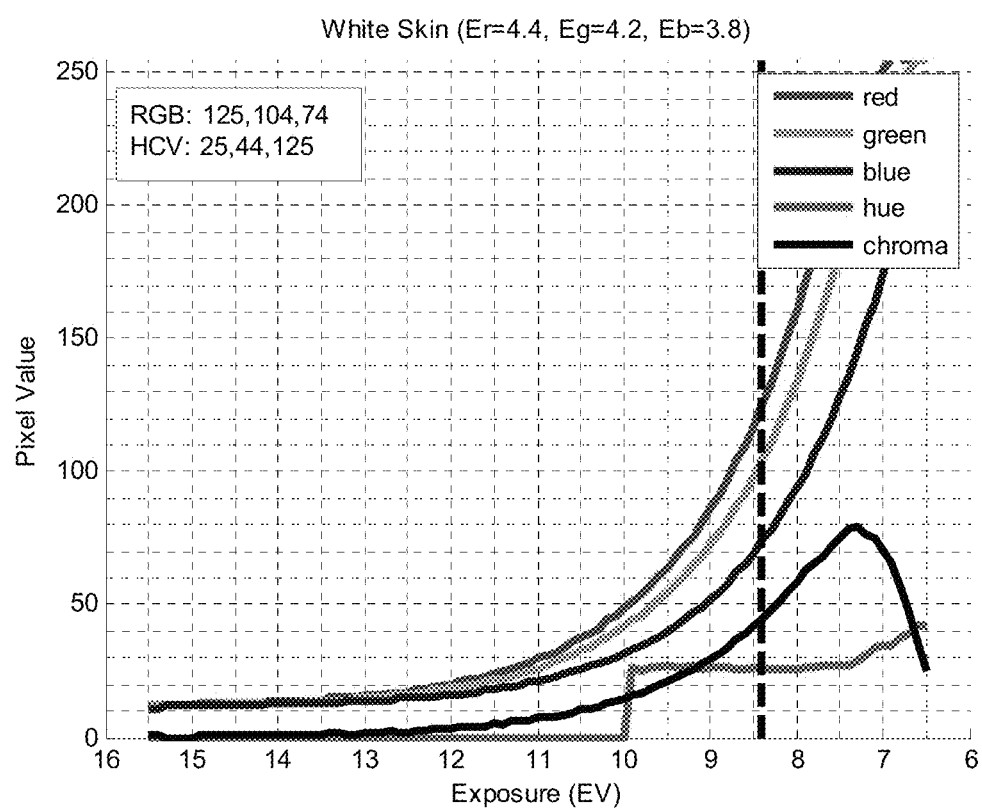

Referring next to FIGS. 13(*a*) and 13(*b*) (collectively FIG. 13), image RGB data is shown as plotted on an RGB cube. In each plot in FIG. 13, a light vector is also plotted as a two-dimensional projection of the RGB cube onto a surface upon which all the data would lie. Different projections of the RGB data onto the light vector are highlighted here at different temperature settings representative of 18 different illuminant surfaces having illuminant color temperatures varying from 2000K to 10500K. Also, a single RGB cube at 6000K, shown in FIG. 14 from different perspectives, highlights the spread of the illuminant estimates for the individual pixels as well as the dominant direction of the illuminant that is associated with them, under an illuminant, defined by its color temperature, in Kelvins. Per the discussion that has been presented earlier, the smallest spread is presented as the most accurate approximation of the correct illuminant.

Integration of Exposure Bracketing Features into Segmentation

As noted above, one potential problem that is associated with segmentation under challenging lighting conditions is that of maintaining color consistency as pixels are being tracked in a field-of-view. In accordance with one or more embodiments of the present invention, through the user of Chroma maximization, color consistency can be achieved and maintained even as color constancy is no longer plausible throughout a scene. A clear distinction should be drawn between color constancy, i.e. maintaining a constant color across the entire span of frames, and color consistency, where a given color is allowed to change, but not across adjacent frames. By computing max Chroma through simulating row lines or exposure values, one can now move on to the problem of segmentation. Specifically, given that different objects may appear with a similar hue or even Chroma under similar lighting conditions, it is left to the use and manipulation of exposure settings to identify differences in different materials and the way that such differences may be exploited in segmentation. In accordance with one or more embodiments of the invention, quality of color-based segmentation accuracy can be accomplished by computing which exposure value(s) would provide for Chroma maximization, per the description of the Camera Response Function at different irradiances. Not only can segmentation now be accomplished based on texture and color as described in U.S. patent application Ser. Nos. 12/784,123; 12/784,022; 13/025,038; 13/025,055; 13/025,070; 13/297,029; 13/297,144; 13/294,481; and 13/316,606, the entire contents of each of these application being incorporated herein by reference, wherein both texture and color are used to segment in stereo images, but one can also define or profile the evolution of such a color across multiple exposure settings, given only a few observations. Such information is then preferably integrated into segmentation and used to further enhance pixel and segment-level discriminability. Thus, a pixel may be classified and clustered by its response at different exposures.

Light Slicing

Figure 18:
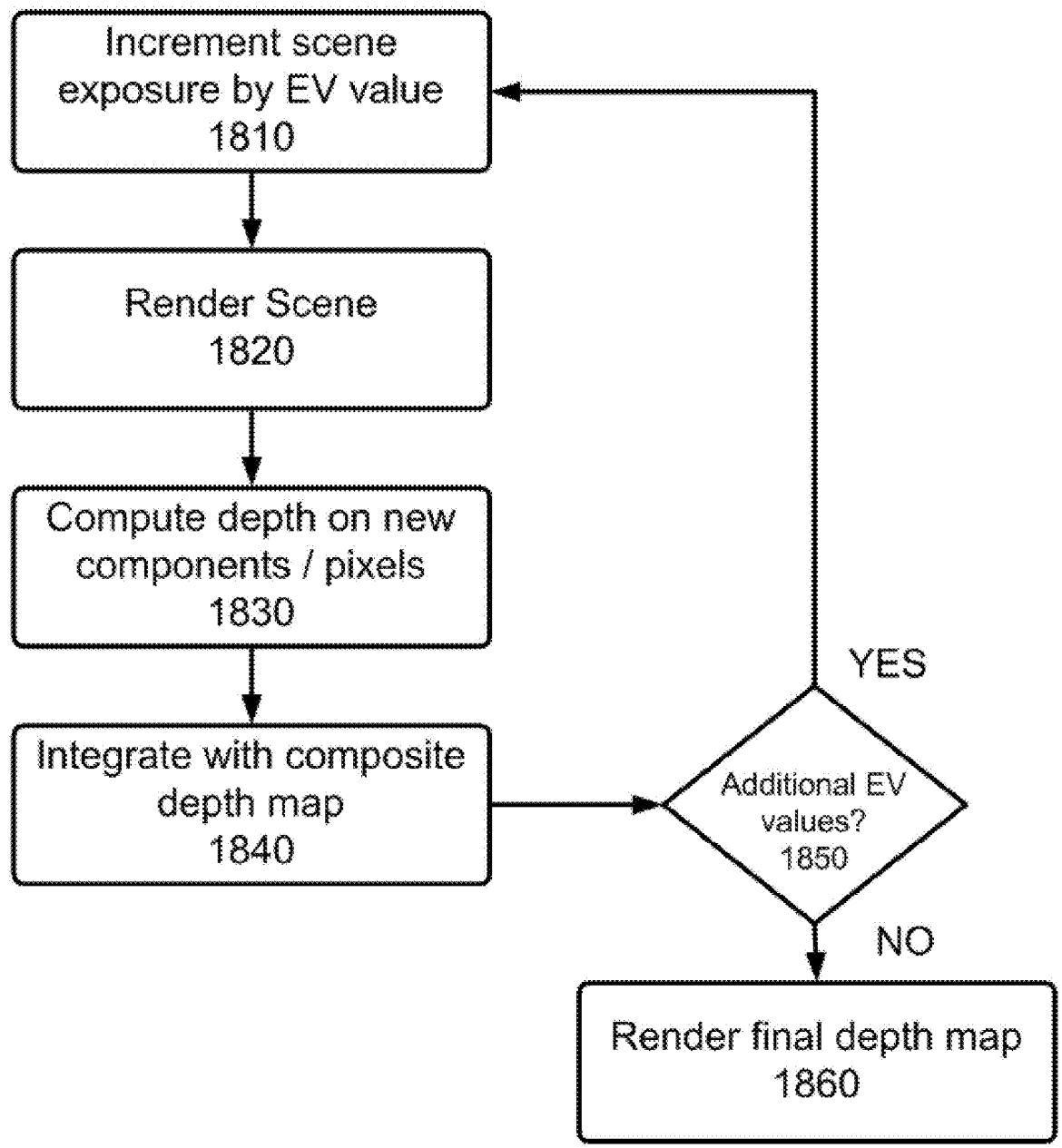
FIG. 18 is a flowchart diagram depicting a light slicing process in accordance with an embodiment of the invention.

Referring next to FIG. 18, One relevant observation about different scenes is that objects have redundant information across multiple light frequencies, and hence multiple exposures. Exploiting this property allows one to methodically decompose the scene based on the luminance that is associated with the different exposure settings. Therefore, in accordance with one or more embodiments of the present invention, in order to simplify the depth computation problem, as described in one or more of as described in U.S. patent application Ser. Nos. 12/784,123; 12/784,022; 13/025,038; 13/025,055; 13/025,070; 13/297,029; 13/297,144; 13/294,481; and 13/316,606, the entire contents of each of these application being incorporated herein by reference, one may approach depth computation by "light slicing" the scene, i.e. exposing the scene at different time intervals, rendering the scene, and then computing depth on the regions that have been rendered. Once depth is computed on the rendered regions, then the exposures are preferably set again to brighten the image. After once again exposing the scene, once again this depth computation process is undertaken, but only new pixels that have appeared in the now brighter image preferably will have their depth computed. The process is terminated once all of the pixels have been marked, or after a desired number exposure jumps have been employed. Thus, as is shown in FIG. 18, an EV value is first incremented at step 1810 and at step 1820 the scene is rendered. At step 1830, any new components or pixels are rendered, and at step these new pixels are integrated with an existing depth map. At step 1850 it is inquired whether there are additional EV values to be employed. If so, processing returns to step 1810. If all desired EV values have been employed, processing passes to step 1860 where a final depth map is rendered.

Color Consistency Towards Feature Constancy

Figure 16A:
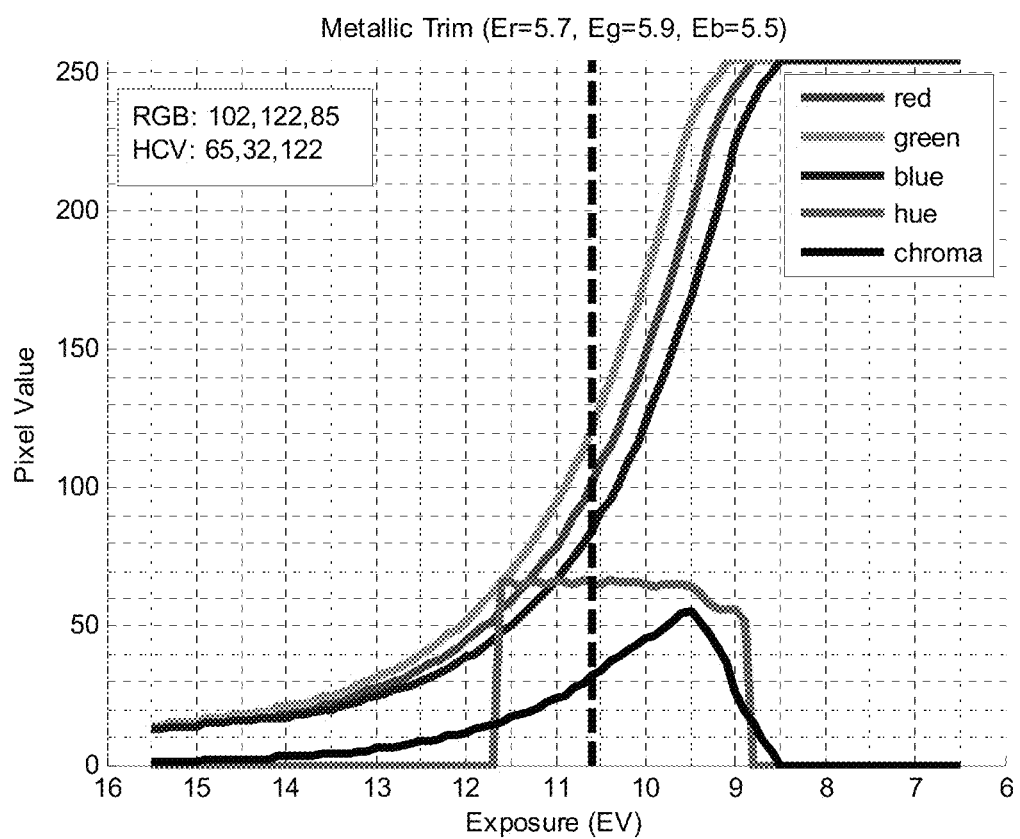
FIGS. 16(*a*) and 16(*b*) are graphs depicting exemplary hue and chroma profiles for metallic trim.
Figure 16B:
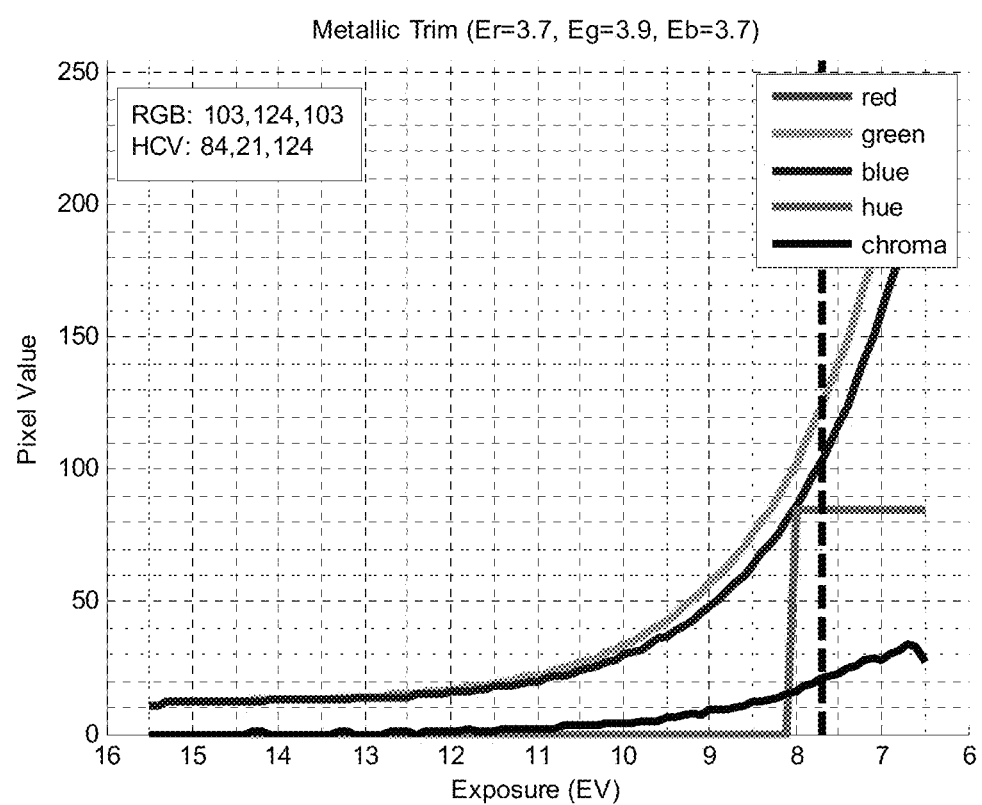

One can now start to look at what features to extract from better discriminability and color quality. These features are presented below, as determined by the inventors of the present invention:

1. Prevalent or Persistent Hue Value:

A prevalent or persistent hue can be extracted from the Chroma maximization graphs that are associated with the camera response functions of the R, G, and B channels, (see FIG. 15 and FIG. 16 for examples). FIGS. 15(*a*)-15(*f*) (collectively FIG. 15) depict highlights of skin tone without white balancing (first row) and with white balancing (second row) under different illuminant and environmental conditions, described and depicted earlier, and including different illuminants, associated with different light temperatures and the like. As can be seen in FIG. 15, there is present a number of very clear distinguishable features, such as a prevalent hue value, and the presence of a Chromaticity peak value within the support window of the hue value. In fact, hue is resilient and consistent across multiple exposures. FIG. 16 depicts an example of hue/Chroma profiles for metallic trim. Note the difference in the profiles, especially relative to skin tone for metallic surfaces and matte surfaces. This is because different materials will respond differently when exposed at different levels of exposures, and hence the images that are subtended at the different exposures will inherently be different as well, when they are evaluated as a whole. This concept refers to the creation of a profile of hue values at different exposure levels. This notion lends itself to the prior described notion of color consistency or prevalent/consistent hue value, with one major difference between this concept and that of color constancy: color constancy algorithms don't take into account the fact that different regions/ materials/black body radiators that are illuminated in the field-of-view by the same illuminant (or different illuminants) may exhibit similar color characteristics. This is especially exacerbated through exposure bracketing (Yeo & Tay, 2009) (Ohsawa, 1990), where a system adaptively changes the set of rolling exposures, based on a set of pre-existing illumination criteria. Exposure bracketing can then lead to hue/Chroma values being reconstructed that may be extremely different from perceptually acceptable ones, or at least those that are perceptually perceived by people in a subjective test. This is quite acceptable since the notion of color constancy in human beings is deeply rooted in hierarchical scene organization, and can't be simply ported over to machines, even ones that do respect Gestalt principles of scene organization. Instead, a different hue metric—the prevalent hue value that is associated with the Chroma maximization graph at different exposures, is proposed. Using such a metric, one can define a hue that is consistently prevalent and robust across a range of exposures. This approach makes the hue estimation significantly more robust to outliers. Typical color hues will exhibit a relatively wide support function/region, (see FIG. 16) in the area of prevalent color, for various EV values, denoting what humans may perceive as color constancy. The width, or the support, of that function may differ, depending on lighting/ irradiance conditions. Any method to extract the prevalent hue by treating the graph as a simple one-dimensional graph, and extracting such a prevalent hue is acceptable in this case. Without limitation, we can mention first and second-order moments, support vector machines, and a principle component analysis as among such methods. A simple best-fit curve may also work.

2. Chroma Profile/Max Chromaticity Identification and The Notion of False Colors:

Typical surfaces with good color quality exhibit good Chroma responses at a range of exposure settings, and may possibly be approximated with a Gaussian curve centered around an optimal exposure. This is especially true for skin tone, where skin tone modeling in the past has focused on Gaussian Mixture Models. For good colors well within a camera's dynamic range, and with adequate lighting, a large support window of high Chromaticity is typically the case (see FIG. 16, for example). On the other hand, over-exposing and under-exposing highly reflective surfaces as well as dark surfaces will typically generate very different responses, and produce what we are referring to in this work as false colors. Such colors' Chromaticity will typically increase with pixel intensity, i.e. exposure values that over-expose the image. Exceptions occur with illuminants whose temperature ranges are warmer (yellow or red). In such cases, black objects may exhibit high chroma settings, consistent with the scene illuminant or light source, or even consistent with the sensor's spectral response for different frequencies of light. As a result, values of Chroma for false colors, i.e. colors that are either generated by the illuminant portion of the field-of-view or by the sensor's spectral response, continually keep increasing. To counter such effects, one can also look at the Chromaticity curve under different exposure conditions. Of particular importance is the range of Chromaticity that produces reliable hue. Hence, a range of exposure values that represent a range of admissible Chroma can be used, as well as the maximum Chroma value, and its location relative to the non-zero support of the Chromaticity range. Hence, profiling Chroma vs. exposure values presents yet another critical piece to the puzzle.

3. Illuminant Estimate:

It now becomes critical to divide up the scene into regions of relatively constant illuminant estimates. Breaking up the scene into ensembles of illuminants has been presented above. However, here, the contribution of an illuminant ensemble map to the computation of depth in a field-of-view is also presented and integrated into the process that has been defined to compute overall depth. One can also mitigate the effects of a given illuminant in the scene. Illuminant estimation for an example illuminant estimation approach has been described above.

4. Irradiance:

As disclosed above, irradiance is a measure of reconstructed brightness incident on a particular pixel in an image. It can be used to detect the amount of light in a scene. Irradiance is also used to compute the maximum Chroma as well as the hue values that are associated with a given pixel. Irradiance is also used for detecting a given feature's constancy in the scene.

Putting it all Together

A novel technique for pixel superresolution is therefore provided in which multiple pixels can be extracted from a smaller number of observations. A multi-dimensional feature vector, v, is given by:

$$v=\{h,c,i,t\} \quad \text{Equation 27}$$

Where h represents the hue feature vector, c represents the Chromaticity feature vector, i represents the irradiance feature vector, and t represents texture as a feature vector. All of these vectors have been described earlier with the exception of t, the texture feature vector. However, using texture has been defined extensively in earlier works by the assignee of the present application, as noted above.

Extraction of Feature Vectors

One of the challenges that is facing all of segmentation is the capability to accurately organize the scene by means of color quality, and texture features, such that different regions in the scene can be organized via color/texture characteristics either in the spatial or frequency domain. Motion features can also be extracted to increase scene segmentation. In accordance with the various embodiments of the invention, the inventors therefore propose an entirely novel approach to scene segmentation through pixel superresolution via features that are extracted from the camera response function.

The above-described process may also be generally applicable to photography, allowing for a high accuracy HDR type process producing images as well as videos with more vivid colors, and less sensitive to difficult lighting conditions.

Application—High Dynamic Range Video and Photography

Given all of the features and the segmentation components presented above, users have the ability to interactively enable HDR features with this approach. Alternatively, an HDR video scheme can be developed that utilizes the various features that have been described above. Specifically, regions of common synthetic exposures may be exposed more uniformly, and various stable segments may be under of over-exposed based on selection criteria defined by the user. Users can also autofocus on different parts of the video in real-time, given that every component of the video is being tracked in real-time.

5. Conclusions

A novel approach to AEB as well as segmentation and disparity computation has been presented that takes into account the utilization of the Camera Response Function to synthetically create different images, maximize chromaticity, and create a notion of color consistency. This is used to produce a robust segmentation/disparity estimation algorithm. Illuminant estimation may also be used for compensating color differences that are impacted by the effect of incident illuminants. The approach has multiple other applications include HDR photography and real-time HDR video.

Furthermore, while the invention has been primarily described related to a general imaging system, the various embodiments of the invention may also be applicable to any other platform that may be used for imaging, including but not limited to mobile devices, devices employing a Graphical Processing Unit (GPU), display on 3D screens, display on 2D screens, various types of photography employing one or multiple single frame or video cameras, and the like.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for imaging a scene comprising the steps of:
    determining a camera response function based upon one or more images captured with a camera;
    synthetically creating profiles of one or more pixels of the one or more images at different exposures;
    determining an exposure of the one or more pixels in one or more of the one or more images resulting in a maximized chroma in accordance with at least the determined camera response function and one or more perceptual parameters resulting in color consistency;
    imaging the scene at the exposure resulting in the maximized chroma; and
    determining a hue associated with the one or more pixels at the exposure resulting in the maximized chroma.

2. The method of claim 1, where in the step of maximizing chroma in an image further comprises the step of employing a set of rolling exposure images to track and compute a max chromaticity.

3. The method of claim 1, wherein the maximizing of chroma maintains color consistency between images.

4. The method of claim 1, further comprising the step of defining color consistency as a hue that is associated with max chromaticity.

5. A method for imaging a scene comprising the steps of:
    determining a camera response function based upon one or more images captured with a camera;
    segmenting one or more regions of interest within the one or more captured images;
    synthetically creating profiles of one or more pixels of the one or more images at different exposures;
    determining an exposure of the one or more pixels in the one or more images resulting in maximized chroma in each of the one or more regions of interest in accordance with the determined camera response function;
    imaging the scene at the exposure resulting in the maximized chroma for one or more of the regions of interest; and
    determining a hue associated with the one or more pixels at the exposure resulting in the maximized chroma.

6. The method of claim 5, further comprising the step of using an ambient illuminant approximator to minimize one or more effects of one or more light sources on the imaging of the scene.

7. The method of claim 6, further comprising the step of tracking color/hue consistency by modeling perceptual elements through the combination of illuminant approximation as well as Chromaticity maximization.

8. The method of claim 5, further comprising the step of segmenting the image based on combining simulated/estimated exposure settings and color/texture/motion features.

9. The method of claim 5, further comprising the step of creating a depth map based on segmentation, combining simulated exposure settings with features of color, texture and motion.

10. A method for imaging a scene comprising the steps of:
    determining a camera response function based upon one or more images captured with a camera;
    segmenting one or more regions of interest within the one or more captured images;
    synthetically creating profiles of one or more pixels of the one or more images comprising the one or more regions of interest at different exposures;
    determining an exposure of the one or more pixels in the one or more images resulting in maximized chroma in each of the one or more regions of interest in accordance with the determined camera response function;
    imaging the scene at each exposure resulting in a maximized chroma for each of the one or more of the regions of interest; and
    generating a composite depth map employing the images generated for each region of interest imaged at the exposure setting resulting in the maximized chroma for that region of interest.

11. The method of claim 10, further comprising the step of using an ambient illuminant approximator to minimize one or more effects of one or more light sources on the imaging of the scene.

12. The method of claim 11, further comprising the step of tracking color/hue consistency by modeling perceptual elements through the combination of illuminant approximation as well as Chromaticity maximization.

13. The method of claim 10, wherein the step of segmenting the image is based on combining simulated/estimated exposure settings and color/texture/motion features.

14. The method of claim 10, wherein the depth map is further generated based on segmentation, combining simulated exposure settings with features of color, texture and motion.

* * * * *